United States Patent
Ozaki et al.

(10) Patent No.: US 7,819,026 B2
(45) Date of Patent: Oct. 26, 2010

(54) SENSOR-EQUIPPED WHEEL SUPPORT BEARING ASSEMBLY

(75) Inventors: Takayoshi Ozaki, Iwata (JP); Tomomi Ishikawa, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 298 days.

(21) Appl. No.: 11/991,480

(22) PCT Filed: Aug. 24, 2006

(86) PCT No.: PCT/JP2006/316601

§ 371 (c)(1),
(2), (4) Date: Mar. 5, 2008

(87) PCT Pub. No.: WO2007/029512

PCT Pub. Date: Mar. 15, 2007

(65) Prior Publication Data

US 2009/0120184 A1 May 14, 2009

(30) Foreign Application Priority Data

| Sep. 6, 2005 | (JP) | 2005-258110 |
| Sep. 16, 2005 | (JP) | 2005-269339 |
| Sep. 16, 2005 | (JP) | 2005-269340 |

(51) Int. Cl.
*G01L 3/14* (2006.01)
(52) U.S. Cl. .................... 73/862.322
(58) Field of Classification Search ............ 73/862.322
See application file for complete search history.

(56) References Cited

U.S. PATENT DOCUMENTS

| 5,129,743 | A | 7/1992 | Faye et al. |
| 5,140,849 | A * | 8/1992 | Fujita et al. ............. 73/593 |
| 5,143,458 | A | 9/1992 | Alff et al. |
| 5,385,411 | A | 1/1995 | Shirai et al. |
| 6,715,926 | B2 | 4/2004 | Tajima et al. |
| 6,802,208 | B2 * | 10/2004 | Chinitz et al. ........... 73/115.07 |
| 7,108,427 | B2 | 9/2006 | Joki et al. |
| 7,197,944 | B2 | 4/2007 | Koyagi et al. |
| 7,212,927 | B2 * | 5/2007 | Yanagisawa et al. ......... 702/41 |

(Continued)

FOREIGN PATENT DOCUMENTS

CN 1455233 11/2003

(Continued)

OTHER PUBLICATIONS

International Preliminary Report on Patentability, mailed Mar. 20, 2008 and issued in corresponding International Patent Application No. PCT/JP2006/316601.

(Continued)

*Primary Examiner*—Lisa M Caputo
*Assistant Examiner*—Octavia Davis

(57) ABSTRACT

A sensor-equipped wheel support bearing assembly, enabling the cost during the mass production to be reduced, includes an outer member, an inner member, a plurality of rolling elements interposed between the opposed raceway surfaces. One of the outer member and the inner member, which serves as a stationary member, is fitted with a sensor mounting member provided with a strain sensor. The sensor mounting member is further provided with a status detecting sensor to detect different status other than a strain.

8 Claims, 22 Drawing Sheets

U.S. PATENT DOCUMENTS

| | | |
|---|---|---|
| 7,320,257 B2 | 1/2008 | Takizawa |
| 7,452,133 B2 * | 11/2008 | Ohtsuki et al. .............. 384/448 |
| 2002/0097040 A1 | 7/2002 | Takizawa et al. |
| 2003/0218548 A1 | 11/2003 | Sato et al. |
| 2005/0016296 A1 | 1/2005 | Inoue |
| 2005/0222740 A1 | 10/2005 | Inoue et al. |
| 2007/0014500 A1 | 1/2007 | Iwamoto et al. |
| 2008/0285901 A1 | 11/2008 | Koike et al. |
| 2009/0038414 A1 | 2/2009 | Ozaki et al. |
| 2009/0080822 A1 | 3/2009 | Ozaki et al. |
| 2009/0097791 A1 | 4/2009 | Ozaki et al. |
| 2009/0114004 A1 | 5/2009 | Ozaki et al. |
| 2009/0129712 A1 | 5/2009 | Ozaki et al. |
| 2009/0324152 A1 | 12/2009 | Ozaki et al. |

FOREIGN PATENT DOCUMENTS

| | | |
|---|---|---|
| JP | 2531492 | 9/1992 |
| JP | 2002-340922 | 11/2002 |
| JP | 2003-530565 | 10/2003 |
| JP | 2003-336653 | 11/2003 |
| JP | 2004-003601 | 1/2004 |
| JP | 2004-3601 | 1/2004 |
| JP | 2004-155261 | 6/2004 |
| JP | 2004-198247 | 7/2004 |
| JP | 2004-360782 | 12/2004 |
| JP | 2005-265175 | 9/2005 |
| JP | 2006-003268 | 1/2006 |
| JP | 2006-010477 | 1/2006 |
| JP | 2006-077807 | 3/2006 |
| JP | 2007-071280 | 3/2007 |
| WO | 01/77634 A2 | 10/2001 |
| WO | 2004/018273 | 3/2004 |

OTHER PUBLICATIONS

U.S. Appl. No. 12/086,153, filed Jun. 6, 2008, Ozaki et al., NTN Corporation.

U.S. Appl. No. 12/086,089, filed Jun. 5, 2008, Ozaki et al., NTN Corporation.

U.S. Appl. No. 12/224,846, filed Sep. 8, 2008, Ozaki et al., NTN Corporation.

U.S. Appl. No. 11/444,343, filed Jun. 1, 2006, Komori et al., NTN Corporation.

Notice of Allowance dated Apr. 5, 2010 issued in corresponding U.S. Appl. No. 12/086,089.

International Search Report (PCT/ISA/210) mailed Oct. 3, 2006 in connection with International Application No. PCT/JP2006/316601.

* cited by examiner

SENSOR-EQUIPPED WHEEL SUPPORT BEARING ASSEMBLY

CROSS REFERENCE TO RELATED APPLICATIONS

This application claims the benefit under 35 U.S.C. Section 371, of PCT International Application PCT/JP2006/316601, filed Aug. 24, 2006, which claimed priority to the following Japanese Patent Applications:

2005-258110, filed Sep. 6, 2005;
2005-269339, filed Sep. 16, 2005; and
2005-269340, filed Sep. 16, 2005 in Japan, the contents of which are incorporated herein by reference.

BACKGROUND OF THE INVENTION 1. (Field of the Invention)

The present invention relates to a sensor-incorporated wheel support bearing assembly equipped with a load sensor for detecting a load acting on a bearing portion of a wheel.

2. (Description of the Prior Art)

For safety travel of an automotive vehicle, the wheel support bearing assembly equipped with a sensor for detecting the rotational speed of one of automotive wheels has hitherto been well known in the art. While the automobile traveling safety precaution is hitherto generally taken by detecting the rotational speed of a wheel of various parts, but it is not sufficient with the detection of only the rotational speed of the wheel and, therefore, it is required to achieve a safety control of the automotive vehicle with the use of other sensor signals.

In view of this, it may be contemplated to achieve an posture control based on a load acting on each of wheels during travel of an automotive vehicle. By way of example, a large load acts on the outside wheels during the cornering, on the wheels on one side during the run along left and right inclined road surfaces or on the front wheels during the braking and, thus, a varying load acts on the vehicle wheels. Also, in the case of the uneven live load, the loads acting on those wheels tend to become uneven. For this reason, if the loads acting on the wheels can be detected as needed, suspension systems for the vehicle wheels can be controlled beforehand based on results of detection of the loads so that the posture control of the automotive vehicle during the traveling thereof (for example, prevention of a rolling motion during the cornering, prevention of downward settling of the front wheels during the braking, and prevention of downward settling of the vehicle wheels brought about by the uneven distribution of live loads) can be accomplished. However, no space for installation of the load sensor for detecting the load acting on the respective vehicle wheel is available and, therefore, the posture control through the detection of the load can hardly be realized.

Also, in the event that in the near future the steer-by-wire is introduced to provide the system, in which the wheel axle and the steering come not to be coupled mechanically with each other, and such system is increasingly used, information on the road surface comes to be required to transmit to the steering wheel held by a driver by detecting a load acting in a wheel axis direction.

In order to meet those needs, the wheel support bearing assembly has been suggested, in which a strain gauge is affixed to an outer race of the wheel support bearing assembly so that the strain gauge can detect a strain acting on the outer race. (See, for example, the Japanese Laid-open Patent Publication No. 2003-530565, published Oct. 14, 2003).

The outer race of the wheel support bearing assembly has at least one raceway surface defined therein and therefore must have a sufficient strength. And also the outer race of the wheel is manufactured through complicated process steps including metal forming, turning, heat treatment, and grinding. Thus, affixation of the strain gauge to the outer race as described in the patent document No. 2003-530565 is not efficient in productivity and is costly when it comes to mass production thereof. Furthermore, it is difficult to detect a strain on the outer race with good sensitivity.

A strain sensor such as the strain gauge is thus affixed to a sensor mounting member to form a sensor unit, which is fitted to the peripheral surface of the outer race to enhance productivity and to improve detection sensitivity. According to such configuration, fitting the strain sensor to the outer race is facilitated, and a strain larger than that on the outer strain appears at the sensor mounting member, whereby the strain on the outer race can be detected with good sensitivity.

However, when the strain sensor unit is fitted in this manner, the temperature of the sensor mounting member varies with the temperature of the wheel support bearing assembly, which changes during the traveling thereof, thus affecting the strain of the sensor mounting member and the operation of the sensor. It is important in carrying out an appropriate posture control to remove such affect of the temperature and to assuredly detect a load acting on each wheel with sufficient accuracy. It is also preferred to detect the abnormal change in temperature of the wheel support bearing assembly so that when faults occur at the wheel support bearing assembly, such faults can be found.

In addition to the sensor for detecting a load, such as the strain gauge, a sensor for detecting an angle of rotation or a direction of rotation of the wheel support bearing assembly can be provided on the wheel support bearing assembly. In this case, the sensor for detecting an angle of rotation is also required to be affixed with low cost, similar to the sensor for detecting a load. It is desirable that both sensors for detecting a load and for detecting an angle of rotation are easily affixed, and wiring for connecting the sensors and a circuit for processing the detected signals by the sensors is not complicated.

In the meanwhile, the wheel support bearing assembly is a component of an automotive vehicle used under various severe conditions. Thus, in order to appropriately carry out various controls and determination of wheel lifespan and maintenance necessity of the automotive vehicle, some statuses of the wheel support bearing assembly must be accurately detected. The status of the wheel support bearing assembly to be detected may include an acceleration of rotation, a vibration, and whether or not water ingress into the bearing assembly space has occurred. By detecting the acceleration, the automotive vehicle can be more appropriately controlled. The vibration is one of the most important factors in determining the bearing lifespan. Water ingress greatly influences degradation of grease. It is desirable for the wheel support bearing assembly to employ a unit for detecting such status at low cost without complicating the detection system.

SUMMARY OF THE INVENTION

An object of the present invention is to provide a sensor-incorporated wheel support bearing assembly, in which the cost during the mass production can be reduced and in which, by compactly installing a load sensor and any of a rotation sensor, a temperature sensor and a status detecting sensor for detecting a status of the wheel support bearing assembly in the vehicle, (i) a load acting on a wheel of the automotive vehicle and a rotation thereof can be detected, (ii) a load acting on a wheel of the automotive vehicle can be certainly detected with less sensitivity to temperature changes and thus with good sensitivity and defects occurring in the wheel support bearing assembly also can be detected, or (iii) a load acting on a wheel of the automotive vehicle can be detected with good sensitivity.

In order to accomplish the foregoing object, in accordance with a first construction of the present invention, there is provided a sensor-equipped wheel support bearing assembly for rotatably supporting a vehicle wheel relative to a vehicle body structure, which includes an outer member having an inner peripheral surface formed with a plurality of raceways; an inner member having an outer peripheral surface formed with a plurality of raceways in face-to-face relation with the raceways in the outer member, and a plurality of rows of rolling elements interposed between the raceways in the outer member and the raceways in the inner member, respectively. One of the outer member and the inner member, which serves as a stationary member, is fitted with a sensor mounting member on a peripheral surface or an end face thereof, the sensor mounting member being provided with a strain sensor. The sensor mounting member is further provided with a sensor of a different type from the strain sensor, namely a status detecting sensor for detecting different status other than a strain.

According to the first construction of the sensor-incorporated wheel support bearing assembly, when during the travel of the automotive vehicle a load acts on the rotating member, the stationary member is deformed through the rolling elements, and the deformation brings about a strain on the sensor mounting member. The strain sensor provided in the sensor mounting member detects the strain on the sensor mounting member. By determining the relation between the strain and the load in advance from experiments and simulations, the load acting on the wheel can be detected from an output of the strain sensor. In other words, by using the output of the strain sensor, the external force acting on the wheel support bearing assembly, the road force acting between the tire and the road surface, or the amount of preload on the wheel support bearing assembly can be estimated. Also, the load so detected can be used for the vehicle control in the automotive vehicle.

Since the sensor-incorporated wheel support bearing assembly has the strain sensor and the status detecting sensor of a different type from the strain sensor, both being provided in the sensor mounting member fitted to the stationary member, the strain sensor and the status detecting sensor can be mounted compactly on the automotive vehicle. Also, since the sensor mounting member is a simple component part adapted to be fitted to the stationary member, the provision of the strain sensor and the status detecting sensor in the sensor mounting member results in excellent mass productivity and reduction of the cost.

In the sensor-incorporated wheel support bearing assembly of the first construction of the present invention, the sensor mounting member may be a ring member and a plurality of the strain sensors may be affixed to the ring member for measuring a strain on the ring member. This is a sensor-incorporated wheel support bearing assembly according to a second construction of the present invention.

In the sensor-incorporated wheel support bearing assembly of the second construction of the present invention, the ring member may include at an axially intermediate portion thereof a first non-contact ring portion not in contact with the stationary member, at one axial end thereof a contact ring portion in contact with the stationary member, and at the other axial end thereof a second non-contact ring portion not in contact with the stationary member and having a wall thickness greater than that of the first non-contacting portion; and in which the strain sensor is fitted to the first non-contacting portion to measure an axial strain on the ring member. This is a sensor-incorporated wheel support bearing assembly according to a third construction of the present invention.

Since the second non-contact ring portion remote from the contact ring portion is formed as a thick-walled portion having a wall thickness greater than that of the first non-contact ring portion, the second non-contact ring portion has high rigidity and thus is hard to be deformed. Therefore, a strain occurring between the thick-walled portion and the contact ring portion represents a transferred and enlarged radial strain on the stationary member, whereby the strain on the stationary member can be detected with good sensitivity to increase the detection accuracy.

In the sensor-incorporated wheel support bearing assembly of the second construction of the present invention, the ring member may include at axially an intermediate portion thereof a first non-contact ring portion not in contact with the stationary member, at one axial end thereof a contact ring portion in contact with the stationary member, and at the other axial end thereof a second non-contact ring portion not in contact with the stationary member and having a flange portion protruding radially in a direction opposite to the contact ring portion and a wall thickness greater than that of the first non-contacting portion, and in which the strain sensor is fitted to the first non-contacting portion to measure an axial strain on the ring member. This is a sensor-incorporated wheel support bearing assembly according to a fourth construction of the present invention.

Since the second non-contact ring portion remote from the contact ring portion is the flange portion, the flange portion has high rigidity and thus is hard to be deformed. Therefore, a strain occurring between the flange portion and the contact ring portion represents a transferred and enlarged radial strain on the stationary member, whereby the strain on the stationary member can be detected with good sensitivity to increase the detection accuracy.

In the sensor-incorporated wheel support bearing assembly of the second construction of the present invention, the ring member may include at an axially intermediate portion thereof a non-contact ring portion not in contact with the stationary member, at one axial end thereof a first contact ring portion in contact with the stationary member, and at the other axial end thereof a second contact ring portion in contact with the stationary member, and in which the strain sensor is fitted to the non-contact ring portion having a minimal wall thickness to measure an axial strain on the ring member. This is a sensor-incorporated wheel support bearing assembly according to a fifth construction of the present invention.

Since the first and the second contact ring portions have the greater wall thickness than that of the non-contact ring portion, those portions have high rigidity and are hard to be deformed whereas the non-contact ring portion has low rigidity and is easy to be deformed. Therefore, an axial strain occurs on the non-contact ring portion, which represents a transferred and enlarged axial strain on the stationary member, whereby the deformation of the stationary member can be detected with good sensitivity by the strain sensor provided in the non-contact ring portion to increase the detection accuracy.

In the sensor-incorporated wheel support bearing assembly of the second construction of the present invention, the ring member may include at an axially intermediate portion thereof a non-contact ring portion not in contact with the stationary member, at one axial end thereof a first contact ring portion in contact with the stationary member, and at the other axial end thereof a second contact ring portion in contact with the stationary member, and in which the strain sensor is fitted to the first contact ring portion having minimal wall thickness to measure a bending strain on the ring member. This is a sensor-incorporated wheel support bearing assembly according to a sixth construction of the present invention.

The first contact ring portion having a small thickness is deformed according to the deformation of the stationary member, while the second contact ring portion and the non-contact ring portion have high rigidity and are hard to be deformed. Therefore, a bending strain occurs on the first contact ring portion having a small wall thickness, which represents a transferred and enlarged axial strain on the peripheral surface of the stationary member, whereby the deformation of the stationary member can be detected with good sensitivity by the strain sensor provided in the first contact ring portion having small wall thickness to increase the detection accuracy.

In the sensor-incorporated wheel support bearing assembly of the first construction of the present invention, the sensor mounting member may include at least two contact mounting portions in contact with the stationary member, at least one notch portion positioned between the adjacent contact mounting portions, and the strain sensor is arranged in the notch portion. This is a sensor-incorporated wheel support bearing assembly according to a seventh construction of the present invention.

According to the seventh construction, the sensor mounting member has at least two contact mounting portions in contact with the stationary member and at least one notch portion positioned between the adjacent contact mounting portions, ant the strain sensor is arranged in the notch portion. Therefore, a strain larger than that on the stationary member occurs in the portion of the sensor mounting member on which the strain is mounted due to reduced rigidity, whereby the strain on the stationary member can be detected with good sensitivity.

In the sensor-incorporated wheel support bearing assembly of the first construction of the present invention, the status detecting sensor may be a magnetic sensor for detecting a rotation, and a to-be-detected member made of a magnetic material may be fitted to a rotatable member so as to confront the magnetic sensor. This is a sensor-incorporated wheel support bearing assembly according to an eighth construction of the present invention.

According to the eighth construction, the to-be-detected member provided on the rotatable member rotates in a circumferential direction thereof relative to the magnetic sensor provided on the stationary member, whereby the outputs of the magnetic sensor are of pulse form. The output signal of the magnetic sensor is processed with an electric control device to detect an angle of rotation, rotational speed, direction of rotation, or the like of the wheel support bearing assembly.

The load so detected by the strain sensor and the rotation of the wheel so detected by the magnetic sensor can be used for vehicle control in the automotive vehicle.

Since the strain sensor and the magnetic sensor are fitted to a common member, both the load and the rotation can be measured at one location. Therefore, a wiring for connecting both sensors and a circuit for processing the detected signals by the sensors can advantageously be simplified.

In the sensor-incorporated wheel support bearing assembly of the first construction of the present invention, the status detecting sensor may be a temperature sensor. This is a sensor-incorporated wheel support bearing assembly according to a ninth construction of the present invention.

According to the ninth construction, the temperature of the sensor mounting member during vehicle travel is detected by the temperature sensor. The temperature characteristics of the strain sensor are compensated based on the output from the temperature sensor. The influence of the temperature of the strain sensor can be eliminated by compensating for the temperature characteristics of the strain sensor, resulting in detection of the load with high accuracy.

Furthermore, when a sensor unit is provided inside an annular bearing space sealed from the outside by sealing device, the temperature of the sensor mounting member and the temperature inside the wheel support bearing assembly will not greatly differ. Therefore, the output of the temperature sensor can be assumed as the temperature inside the wheel support bearing assembly and used to monitor the temperature inside the bearing assembly. For instance, when the temperature inside the wheel support bearing assembly detected by the temperature sensor is higher than that in normal use, an abnormality signal is outputted assuming that defects have occurred in the wheel support bearing assembly. The attention of the driver then can be drawn to the defects.

In the sensor-incorporated wheel support bearing assembly of the first construction of the present invention, the status detecting sensor may be at least one of an acceleration sensor, a vibration sensor and moisture sensor. This is a sensor-incorporated wheel support bearing assembly according to a tenth construction of the present invention.

According to the tenth construction, a status of the wheel support bearing assembly is detected by the status detecting sensor provided on the sensor mounting member, that is, at least one of the sensors of the acceleration sensor, the vibration sensor and the moisture sensor. The output of the status detecting sensor is used to control the automotive vehicle along with the output of the strain sensor.

Since the strain sensor and the status detecting sensor (the acceleration sensor, the vibration sensor or the moisture sensor) are provided on the sensor mounting member, both the load and the status of the wheel support bearing assembly can be measured at one location.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claim. In the accompanying drawings, like reference numerals are used to denote like parts throughout the several views, and:

DETAILED DESCRIPTION OF THE EMBODIMENTS

Figure 1:
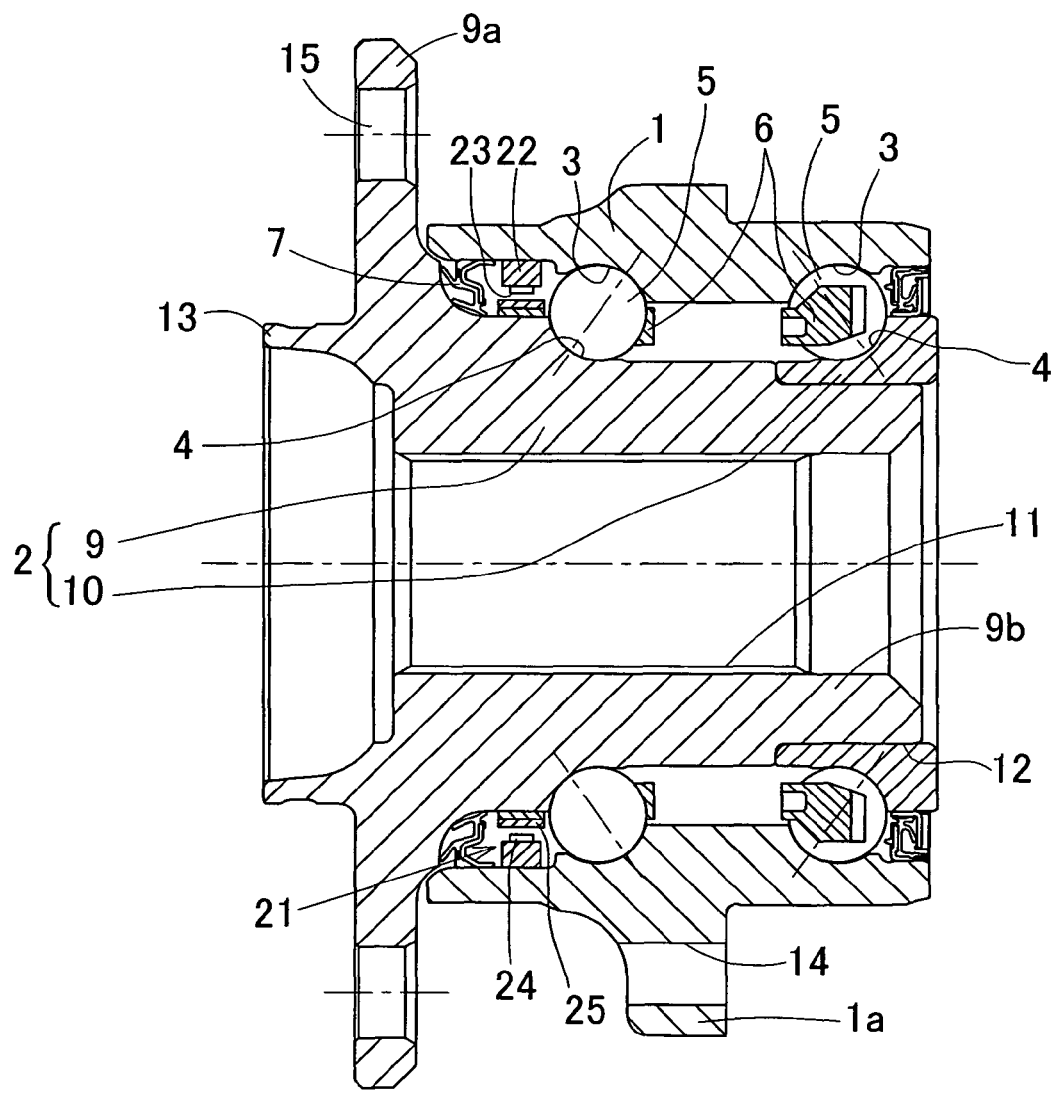
FIG. 1 is a longitudinal sectional view of a sensor-incorporated wheel support bearing assembly according to a first embodiment of the present invention.

A first preferred embodiment of the present invention will be described with reference to FIGS. 1 to 4. This embodiment is directed to a third-generation wheel support bearing assembly of an inner-race rotating type that is used for the support of a vehicle drive wheel. It is to be noted that in the specification herein set forth, the terms "outboard" and "inboard" represent one side of the vehicle body away from the longitudinal center of the vehicle body and the other side of the vehicle body close to the longitudinal center of the vehicle body, respectively.

The sensor-incorporated wheel support bearing assembly shown therein includes an outer member 1 having an inner peripheral surface formed with a plurality of raceways 3, an inner member 2 having a outer peripheral surface formed with a plurality of raceways 4 opposed to those raceways 3, and a plurality of rows of rolling elements 5 interposed between the raceways 3, 4 in the respective outer and inner members 1 and 2. The wheel support bearing assembly is in the form of a double row angular contact ball bearing. The rolling elements 5 are in the form of balls and are retained by a retainer 6 employed for each row of those rolling elements 5. Each of the raceways 3 and 4 represents an arcuate shape in section and the raceways 3 and 4 are so formed as to have respective contact angles held in back-to-back relation with each other. Both ends of a bearing space delimited between the outer member 1 and the inner member 2 are sealed by respective sealing devices 7 and 8.

The outer member 1 serves as a stationary member and is formed as an unitary member having on an outer peripheral surface thereof a flange 1a adapted to be fitted to a knuckle in a suspension system (not shown) of an automotive vehicle body structure. The flange 1a is formed with a plurality of vehicle body mounting holes 14 spaced circumferentially from each other.

The inner member 2 serves as a rotating member and is made up of a hub axle 9 having a wheel mounting hub flange 9a and an inner race 10 mounted fixedly on the outer peripheral surface at an inboard end of an axial portion 9b of the hub axle 9. The raceways 4 are formed in the hub axle 9 and the inner race 10, respectively. A portion of the outer peripheral surface at the inboard end of the hub axle 9 is radially inwardly stepped or decreased in diameter to define an inner race mounting area 12, on which the inner race 10 is fixedly mounted. The hub axle 9 has a radial center portion formed with a throughhole 11. The hub flange 9a is formed with a plurality of press-fitting holes 15 spaced circumferentially from each other, into which hub bolts (not shown) are press-fitted. The hub axle 9 is provided, in the vicinity of a root of the hub flange 9a, with a cylindrical pilot portion 13, for guiding wheels and brake component parts (not shown), protruding axially in an outboard direction from the hub axle 9.

A sensor unit 21 is provided on the inner peripheral surface of the outer member 1 at the outboard end thereof. The sensor unit 21 is axially positioned at a location between the sealing device 7 and the raceways 3. The sensor unit 21 includes a ring member (sensor mounting member) 22, a plurality of strain sensors 23 affixed to the ring member 22 for measuring a strain on the ring member 22; and a magnetic sensor 24 of a type different from the strain sensor 23, which is also affixed to the ring member 22, for detecting a rotation. The strain sensors 23 are equally spaced in a direction circumferentially of the ring member 22 and, in this embodiment, four strain sensors 23 are positioned on upward side, downward side, leftward side and rightward side, respectively, of the wheel support bearing assembly. The magnetic sensor 24 is also affixed to the ring member 22 at the inner peripheral surface thereof, and positioned between a pair of strain sensors 23 and 23 adjacent in a circumferential direction thereof. In this embodiment, the cross sectional shape of the ring member 22 is a rectangle.

The magnetic sensor 24 may employ a Hall element using the Hall effect, a magnetoresistive element using the magnetoresistive effect, and the like.

Figure 4A:
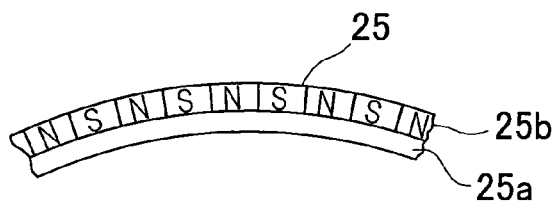
FIG. 4A is a front view of the important portion of a magnetic encoder.
Figure 4B:
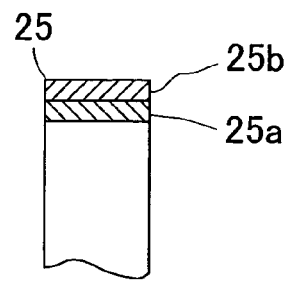
FIG. 4B is a cross sectional view of the important portion of the magnetic encoder.

A magnetic encoder 25 serving as a to-be-detected member for the magnetic sensor 24 is affixed to the inner member 2 at the outer peripheral surface thereof and disposed in face-to-face relation with a tip end surface of the magnetic sensor 24. The magnetic sensor 24 and the magnetic encoder 25 form a rotation sensor. As shown in FIG. 4, the magnetic encoder 25 includes a ring-shaped core member 25a and a multipolar magnet 25b made of rubber magnet or the like, which is mounted on an outer periphery of the core member 25a. The multipolar magnet 25b is magnetized with multipoles to have circumferentially alternating magnetic poles N and S. The multipolar magnet 25b may a plastic magnet or a sintered magnet other than the rubber magnet, and may also be made of ferrite material or the like.

The ring member 22 of the sensor unit 21 is press-fitted onto the inner peripheral surface of the outer member 1. The ring member 22 is preferably formed of a shape and material not plastically deformable during the press-fitting process, and more preferably not plastically deformed by external force acting on the wheel support bearing assembly or by an expected maximum value of the road force acting between a tire and the road surface. As the material of the ring member, a steel material or other metal materials such as copper, brass, or aluminum, can be used. The ring member 22 is obtained by pressing a material made of those metal materials or is obtained by machining those metal materials.

Figure 5:
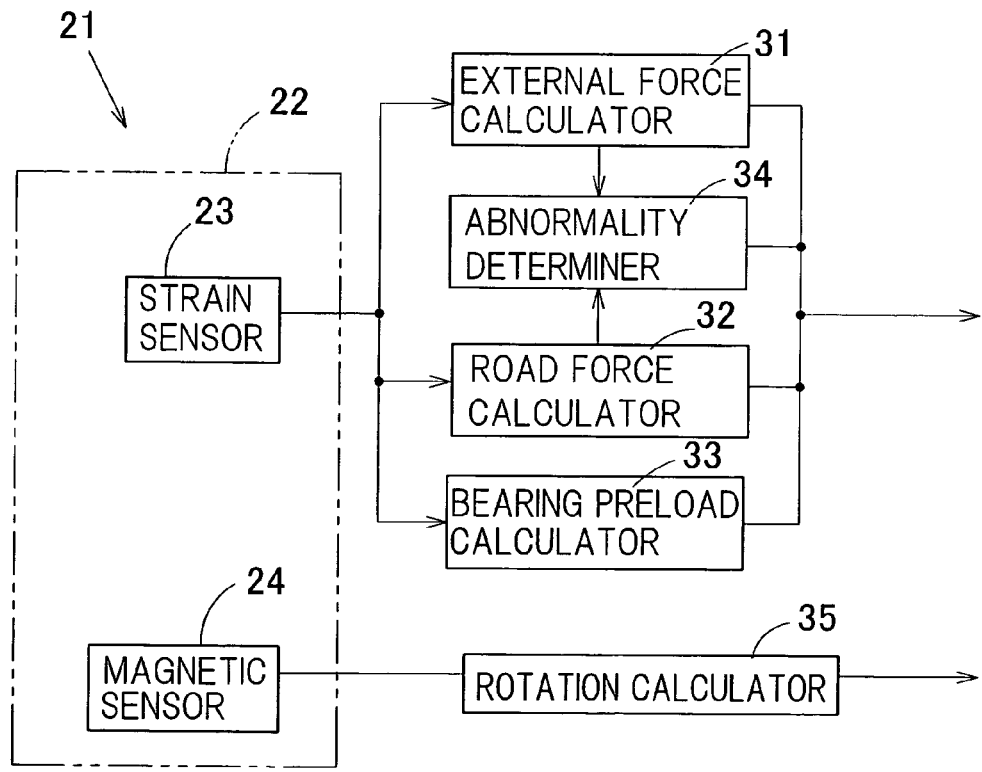
FIG. 5 is a block diagram showing a conceptual structure of a sensor signal processing circuit for to the first and a second to a sixth embodiments of the present invention.

As shown in FIG. 5, the strain sensor 23 is connected to an external force calculator 31, a road force calculator 32, a bearing preload calculator 33 and an abnormality determiner 34 while the magnetic sensor 24 is connected to a rotation calculator 35, to form a sensor signal processing circuit for detecting a load or the like by processing the outputs of the strain sensors 23 and detecting rotational speed or the like by processing the output of the magnetic sensor 24 is formed. Each unit 31 to 35 may be provided in an electronic circuit device (not shown) such as a circuit board fitted to, for example, the outer member 1 of the wheel support bearing assembly or in an electric control unit (ECU) of the automotive vehicle.

The operation of the sensor-incorporated wheel support bearing assembly of the structure discussed above will be described. Under the effect of a load acting on the hub axle 9, the outer member 1 is deformed through the rolling elements 5 and the deformation of the outer member 1 is transmitted to the ring member 22 fitted to the inner peripheral surface of the outer member 1, resulting in deformation of the ring member 22. The deformation or a strain on the ring member 22 is measured with the strain sensors 23.

Changes in the strain are different depending on the direction or the magnitude of the load. By determining the relation between the strain and the load in advance from experiments and simulations, the external force acting on the wheel support bearing assembly or the road force acting between the tire and the road surface can be calculated. The external force calculator 31 and the road force calculator 32 calculate the external force acting on the wheel support bearing assembly and the road force acting between the tire and the road surface, respectively, from the outputs of the strain sensor 23, based on the relation between the strain and the load which has been predetermined from experiments and simulations.

The abnormality determiner 34 is operable to output an abnormality signal to the outside when it is determined that the external force acting on the wheel support bearing assembly, or the road force acting between the tire and the road surface, obtained as described above, exceeds a predetermined tolerance value. The abnormality signal can be used for the vehicle control of the automotive vehicle.

Also, by outputting, on a real time basis, the external force acting on the wheel support bearing assembly and the road force acting between the tire and the road surface from the external force calculator 31 and the road force calculator 32, respectively, the automotive vehicle can be controlled more precisely and flexibly.

Furthermore, since the preload is imposed on the wheel support bearing assembly through the inner race 10, the ring member 22 is deformed by the effect of such preload. For this reason, by determining the relation between the strain and the preload in advance from experiments and simulations, the condition of the preload in the wheel support bearing assembly can be ascertained. The bearing preload calculator 33 is utilized to output a bearing preload through output of the strain sensor 23 based on the relation between the strain and the preload which has been predetermined from experiments and simulations. In addition, when the preload outputted from the bearing preload calculator 33 is utilized, the preload to be applied during assembling of the wheel support bearing assembly can be easily adjusted.

When the inner member 2 rotates together with the automotive vehicle wheel, the magnetic encoder 25 provided on the inner member 2 rotates in a circumferential direction thereof relative to the magnetic sensor 24. Thus, the magnetic sensor 24 outputs an output signal every time the magnetic pole N or S alternately formed in the circumferential direction at the multipolar magnet 25*b* of the magnetic encoder 25 passes the position confronting the magnetic sensor 24. The output signal of the magnetic sensor 24 is sequentially transmitted to the rotation calculator 35. The rotation calculator 35 counts the number of output signals per unit time, and calculates the rotational speed of wheel, in other words, the vehicle speed based thereon. The rotational speed calculated in this manner can be used for the vehicle control of the automotive vehicle.

The direction of rotation can be calculated in addition to the rotational speed by providing the magnetic sensor 24 on the member at two locations, which are not 180 degrees apart. The rotational speed and the direction of rotation can also be calculated in case that the magnetic sensor 24 is provided on the member at three or more locations.

Since the rotational speed of the wheel can be accurately detected by using the multipolar magnet 25*b*, in which a great number of magnetic poles is arranged in a circumferential direction of the wheel, as in the magnetic encoder 25 of the present embodiment, it can be applied particularly to a rotation sensor that requires accuracy such as a rotation sensor used in anti-lock brake system (ABS). It is to be noted that the magnetic encoder serving as a to-be-detected member for the magnetic sensor 24 may have at least one or more magnetic poles arranged in a circumferential direction of the wheel.

Figure 6:
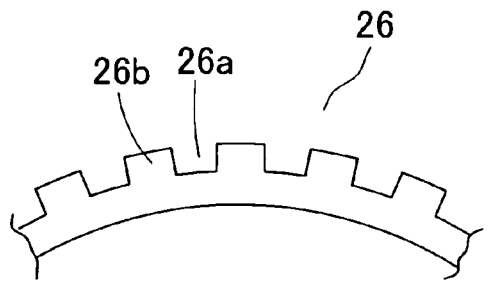
FIG. 6 is a front view of the important portion of a pulsar ring.

Alternative to the magnetic encoder, the to-be-detected member for the magnetic sensor 24 may be a gear shaped pulsar ring 26 made of a magnetic material ring having periodic concave and convex surface in a circumferential direction thereof, as shown in FIG. 6. In the pulsar ring 26, the magnetic sensor 24 outputs the output signal every time a concave 26*a* or a convex 26*b* passes the position confronting the magnetic sensor 24.

Figure 7A:
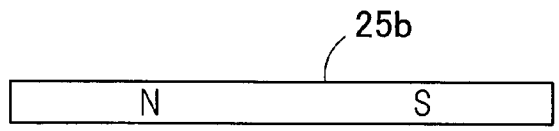
FIG. 7A is a developed view of the magnet of the magnetic encoder.
Figure 7B:
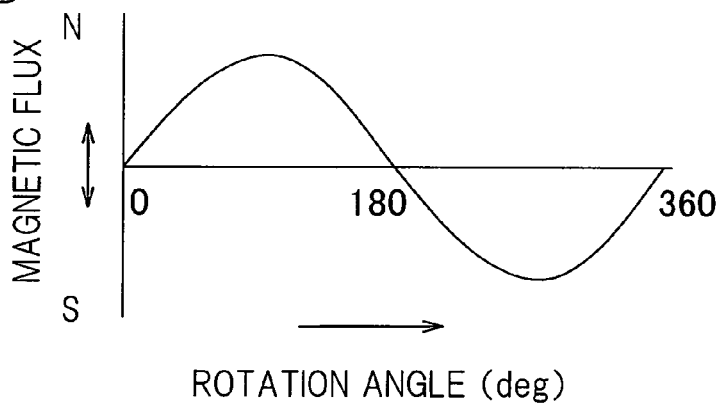
FIG. 7B is a graph showing a magnetized state of the magnetic encoder.

As shown in FIG. 7, when magnetizing the magnet 25*b*, such as the rubber magnet, of the magnetic encoder 25 with a sinusoidal waveform having a cycle matching with on completion rotation of the rotatable member, the absolute angle can be detected since the magnitude of the magnetic flux from the to-be-detected member to the magnetic sensor changes with the rotation angle of the rotatable member. FIG. 7A is a view showing the circular magnet 25*b* developed to a straight line, and FIG. 7B is a graph showing the magnetized state thereof.

Figure 8:
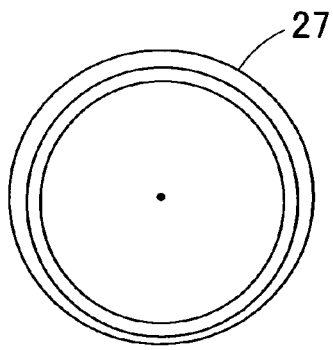
FIG. 8 is a front view of another pulsar ring.

As shown in FIG. 8, due to the same reasons described above, the absolute angle of the wheel can be detected by disposing the pulsar ring 27 eccentrically with respect to the rotation axis of the wheel support bearing assembly.

Since the sensor-incorporated wheel support bearing assembly has the strain sensor and the magnetic sensor provided in the sensor mounting member fitted to the stationary member, the load detection sensor and the rotation detection sensor can be mounted compactly on the automotive vehicle. Also, since the sensor mounting member is a simple component parts adapted to be fitted to the stationary member, the provision of the strain sensor and the magnetic sensor in the sensor mounting member results in excellent mass productivity and reduction of the cost.

Since the strain sensor and the magnetic sensor are fitted to a common member, both the load and the rotation can be measured at one location. Therefore, a wiring for connecting the sensors and the circuit for processing the detected signals by the sensors can advantageously be simplified.

Figure 9:
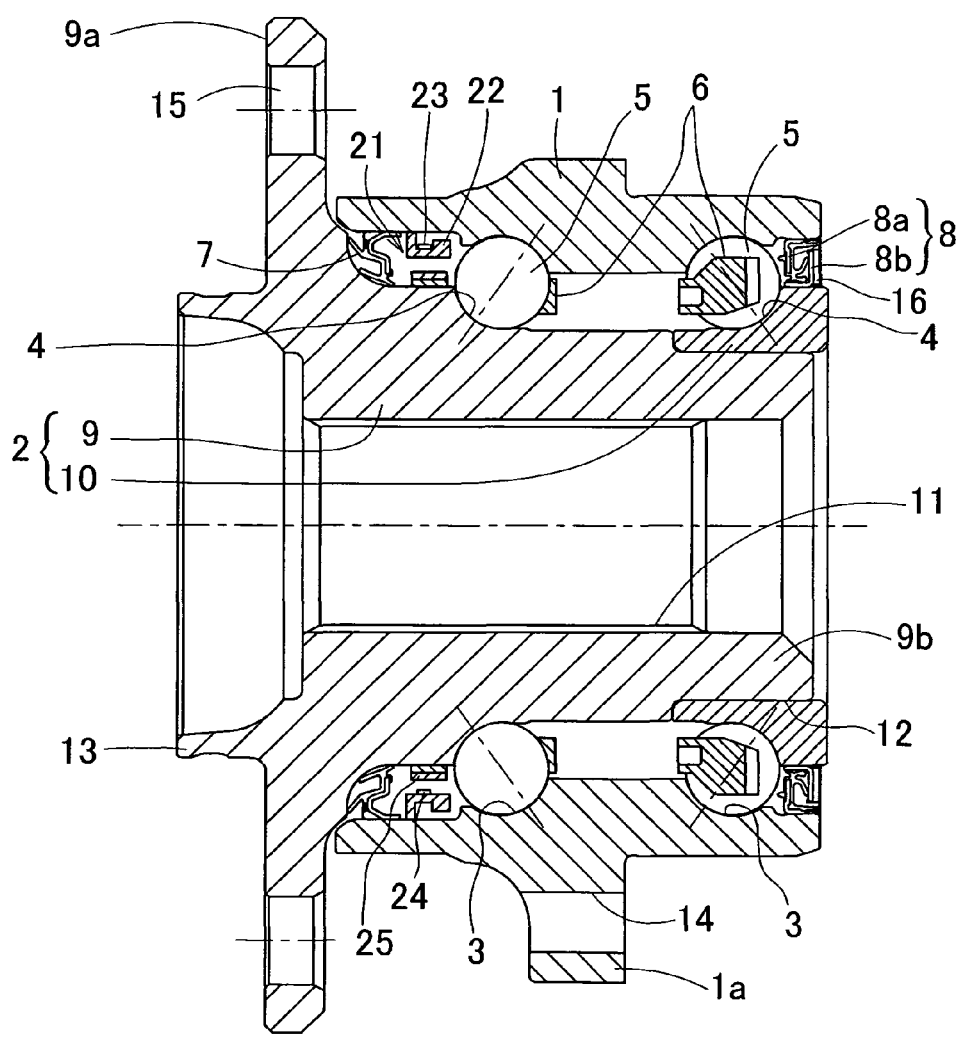
FIG. 9 is a longitudinal sectional view of a sensor-incorporated wheel support bearing assembly according to a second embodiment of the present invention.
Figure 10:
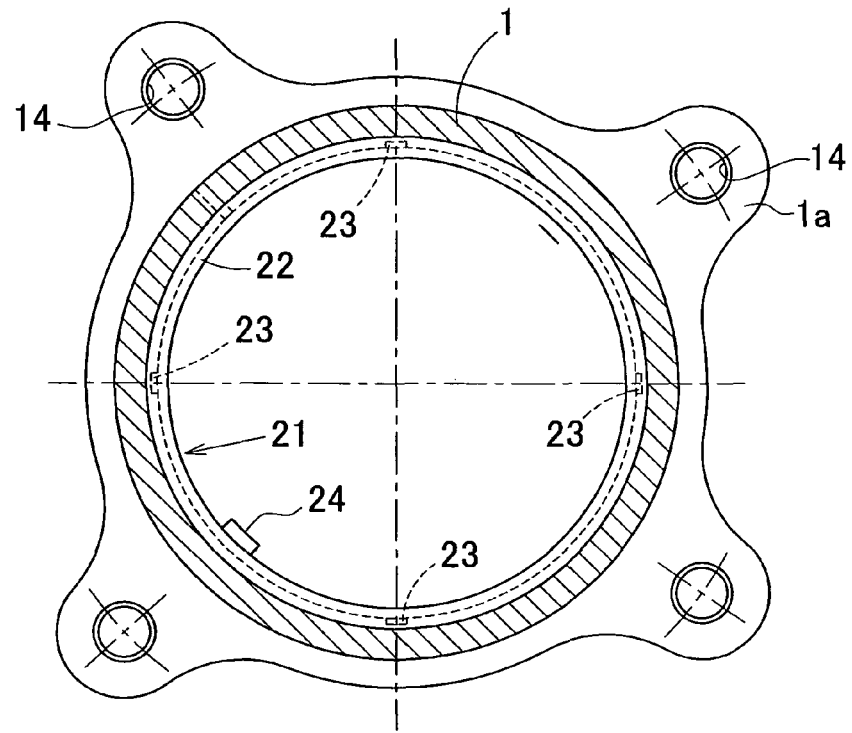
FIG. 10 is a partial sectional front view showing an outer member and a sensor unit of the sensor-incorporated wheel support bearing assembly according to the second, an eighth and a fourteenth embodiments of the present invention.
Figure 11A:
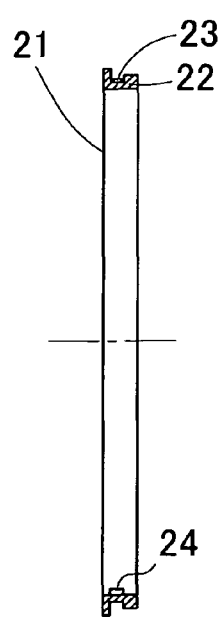
FIG. 11A is a transverse cross sectional view of the sensor unit employed in the sensor-incorporated wheel support bearing assembly according to the second, the eighth and the fourteenth embodiments of the present invention.
Figure 11B:
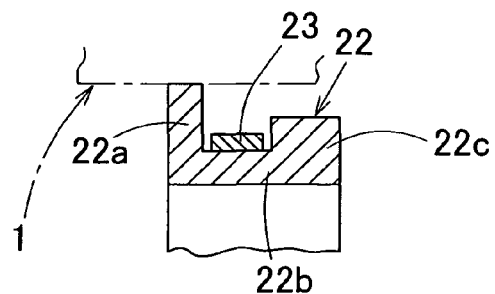
FIG. 11B is an enlarged view of an important portion of the sensor unit shown in FIG. 11A.

FIG. 9 to FIG. 11 show a second embodiment of the present invention. This embodiment differs from the first embodiment in the structure of the ring member 22 constituting the sensor unit 21, but other structural features of the second embodiment are similar to those of the first embodiment, and thus same reference numerals are denoted for the common parts and the description thereof will be omitted.

The ring member 22 has, as represented by a sectional shape shown in FIG. 11, a contact ring portion (a first contact ring portion) 22*a* in contact with the inner peripheral surface of the outer member 1, a non-contact ring portion (a first non-contact ring portion) 22*b* not in contact with the inner peripheral surface of the outer member 1 and extending axially of the ring member 22, and a thick-walled portion (a second non-contact ring portion) 22*c* having a wall thickness greater than those of the first non-contact ring portion 22*b* and the first contact ring portion 22*a*, and positioned adjacent to the first non-contact portion 22*b* on the side remote from the contact ring portion 22*a*.

The strain sensors 23 for measuring an axial strain on the ring member 22 are affixed, at four locations, to the outer peripheral surface of the non-contact ring portion 22*b* formed at an intermediate portion between the contact ring portion 22*a* and the thick-walled portion 22*c* (the bottom portion of a recess groove shaped portion between the contact ring portion 22*a* and the thick-walled portion 22*c*). The magnetic sensor 24 for rotation detection, which is of a type different from the strain sensor 23, is affixed to the inner peripheral surface of the non-contact ring portion 22*b*, and the magnetic encoder 25 serving as the to-be-detected member is attached to the outer peripheral surface of the inner member 2 facing the magnetic sensor 24.

Also, under the effect of a load acting on the hub axle 9, the outer member 1 is deformed through the rolling elements 5 and the deformation of the outer member 1 is transmitted to the ring member 22 fitted to the inner peripheral surface of the outer member 1, resulting in deformation of the ring member 22. The deformation or a strain on the ring member 22 is measured with the strain sensors 23. In the sensor unit 21 employed in this embodiment, since the second non-contact ring portion 22*c* remote from the contact ring portion 22*a* of the ring member 22 is formed as the thick-walled portion 22*c* having a wall thickness greater than other portions, this portion has high rigidity and thus is hard to be deformed. Accordingly, the strain occurring between the thick-walled portion 22*c* and the contact ring portion 22*a* represents a transferred and enlarged radial strain on the outer member 1. Therefore, the strain sensor 23 can detect the deformation of the outer member 1 with high sensitivity, resulting in increase of the strain measurement accuracy.

As described in connection with the first embodiment, the magnetic sensor 24 outputs an output signal every time the magnetic pole N or S of the magnetic encoder 25 passes the position confronting the magnetic sensor 24 with the rotation of the internal member 2. In this way the rotation of the internal member 2 can be detected.

Also, the outputs of the strain sensors 23 and the output of the magnetic sensor 24 can be processed by the sensor signal processing circuit shown in FIG. 5.

Figure 12:
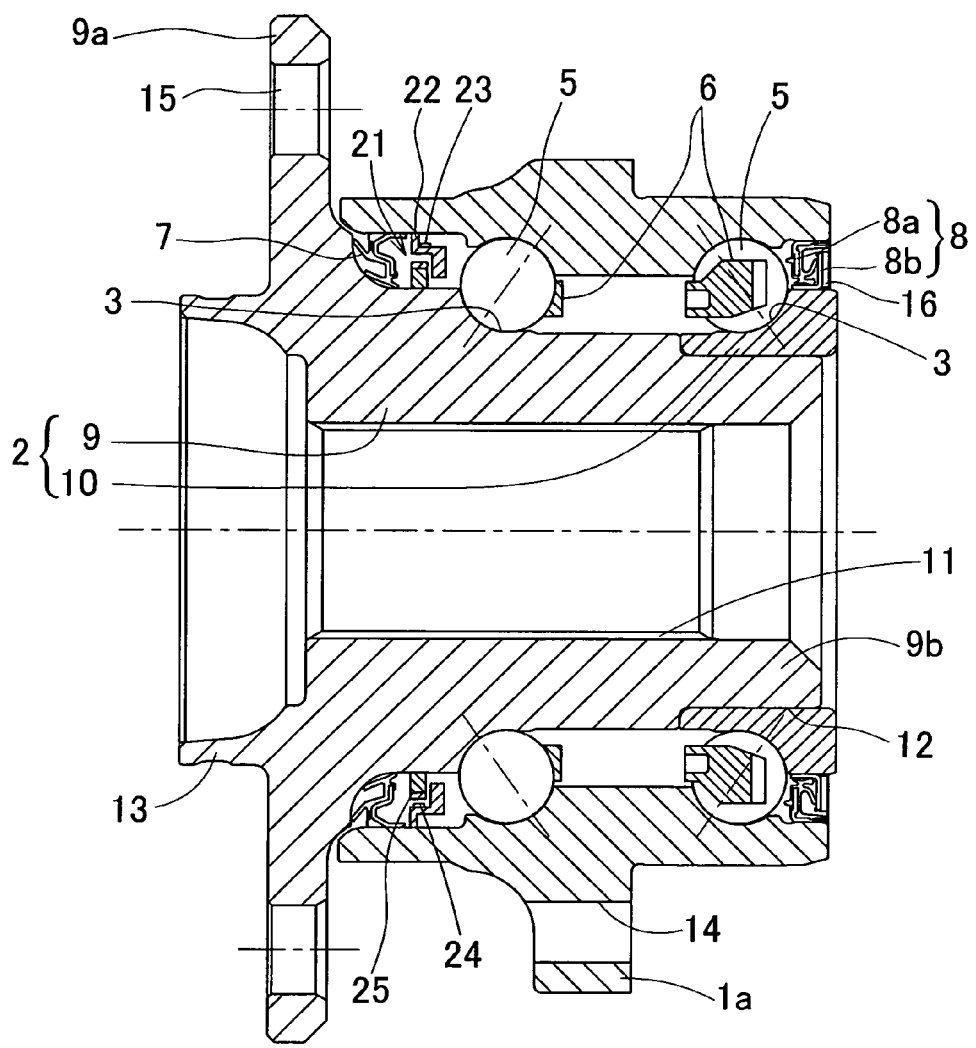
FIG. 12 is a longitudinal sectional view of a sensor-incorporated wheel support bearing assembly according to a third embodiment of the present invention.
Figure 13:
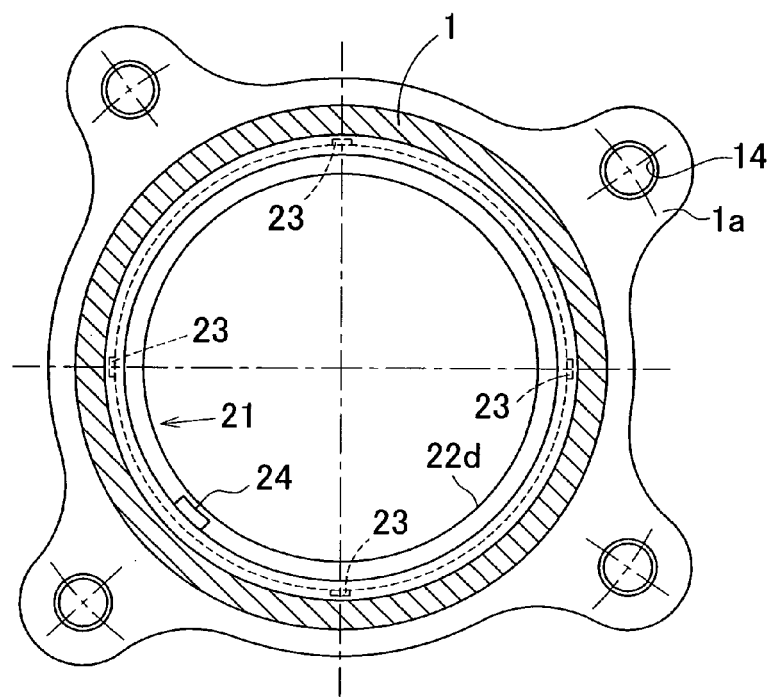
FIG. 13 is a partial sectional front view showing an outer member and a sensor unit of the sensor-incorporated wheel support bearing assembly according to the third, a ninth, and a fifteenth embodiments of the present invention.
Figure 14A:
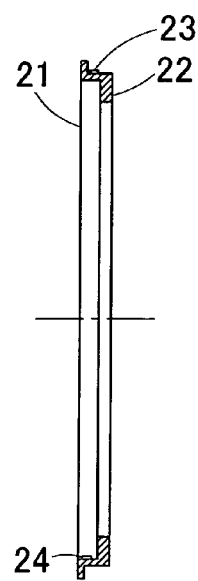
FIG. 14A is a transverse cross sectional view of the sensor unit employed in the sensor-incorporated wheel support bearing assembly according to the third, the ninth, and the fifteenth embodiments of the present invention.
Figure 14B:
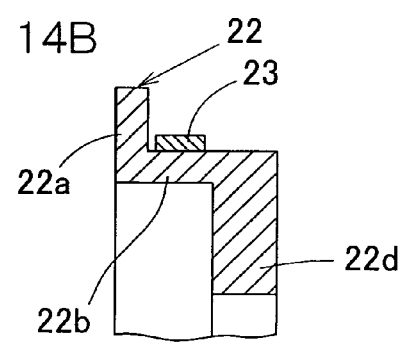
FIG. 14B is an enlarged view of the important portion of the sensor unit shown in FIG. 14A.

FIG. 12 to FIG. 14 show a third embodiment of the present invention. This embodiment differs from the first and the second embodiments in the structure of the ring member 22 constituting the sensor unit 21, but other structural features of the third embodiment are similar to those of the first and the second embodiments, and thus same reference numerals are denoted for the common parts and the description thereof will be omitted.

As shown in FIG. 14, the second embodiment is similar to the second embodiment in that the ring member 22 has the contact ring portion (the first contact ring portion) 22a in contact with the inner peripheral surface of the outer member 1 and the non-contact ring portion (the first non-contact ring portion) 22b not in contact with the inner peripheral surface of the outer member 1 and extending axially of the ring member 22, but is different from the second embodiment in that the ring member 22 further has a flange portion (a second non-contact ring portion) 22d protruding radially inwardly, and positioned adjacent to the first non-contact ring portion 22b on the side remote from the contact ring portion 22a.

In this case, the strain sensors 23 for measuring an axial strain on the ring member 22 are affixed to the outer peripheral surface of the non-contact ring portion 22b between the contact ring portion 22a and the flange portion 22d (the outer peripheral surface of a cylindrical portion between the contact ring portion 22a and the flange portion 22d), that is, the first non-contact ring portion 22b. The magnetic sensor 24 for rotation detection, which is of a type different from the strain sensor 23, is affixed to the inner peripheral surface of the non-contact ring portion 22b, and the magnetic encoder 25 serving as the to-be-detected member is attached to the outer peripheral surface of the inner member 2 facing the magnetic sensor 24.

In this embodiment, as described above, under the effect of a load acting on the hub axle 9, the outer member 1 is deformed through the rolling elements 5 and the deformation of the outer member 1 is transmitted to the ring member 22 fitted to the inner peripheral surface of the outer member 1, resulting in deformation of the ring member 22. In the sensor unit 21 of this embodiment, since on the portion of the non-contact ring portion 22b remote from the contact ring portion 22a the flange portion 22d protruding radially inwardly is provided, the flange portion 22d has high rigidity and thus is hard to be deformed. Accordingly, the strain occurring between the flange portion 22d and the contact ring portion 22a represents the transferred and enlarged radial strain on the outer member 1. Therefore, as described above, the strain measurement with high accuracy can be expected.

As described in connection with the first and second embodiments, the magnetic sensor 24 outputs an output signal every time the magnetic pole N or S of the magnetic encoder 25 passes the position confronting the magnetic sensor 24 with the rotation of the internal member 2. In this way the rotation of the internal member 2 can be detected.

Also, the outputs of the strain sensors 23 and the output of the magnetic sensor 24 can be processed by the sensor signal processing circuit shown in FIG. 5.

Figure 15:
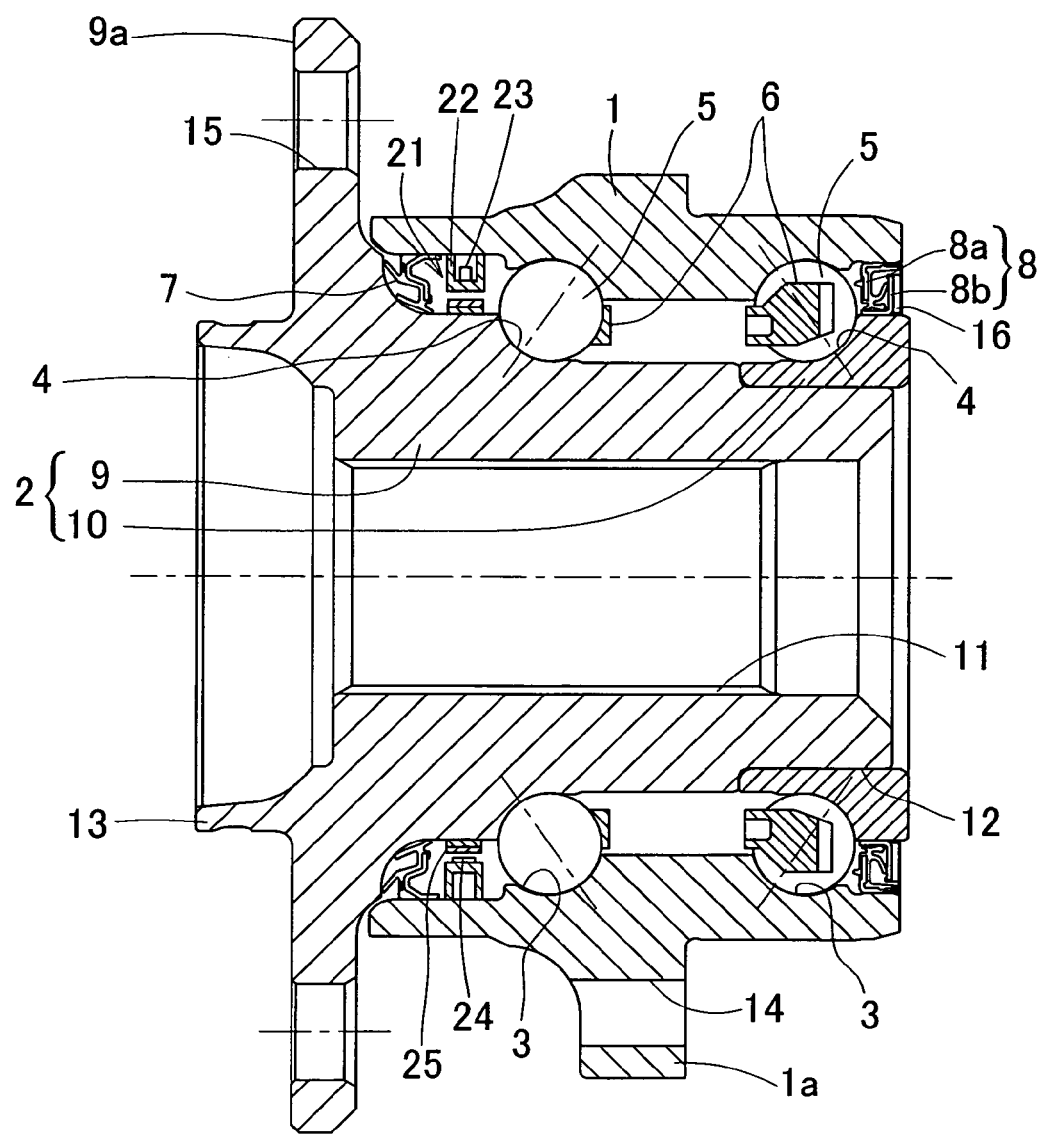
FIG. 15 is a longitudinal sectional view of a sensor-incorporated wheel support bearing assembly according to a fourth embodiment of the present invention.
Figure 16:
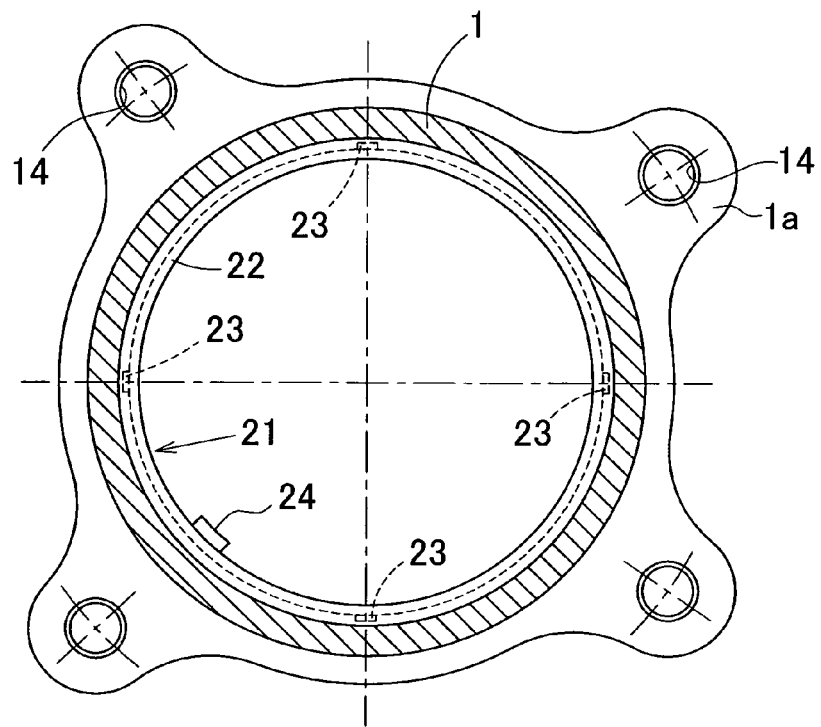
FIG. 16 is a partial sectional front view showing an outer member and a sensor unit of the sensor-incorporated wheel support bearing assembly according to the fourth, a tenth, and a sixteenth embodiments of the present invention.
Figure 17A:
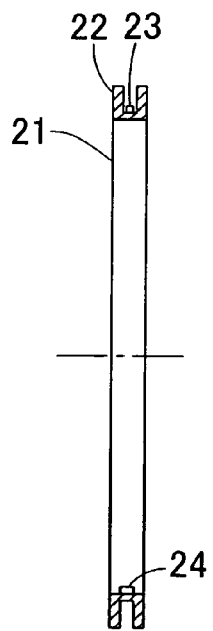
FIG. 17A is a transverse cross sectional view of the sensor unit employed in the sensor-incorporated wheel support bearing assembly according to the fourth, the tenth, and the sixteenth embodiments of the present invention.
Figure 17B:
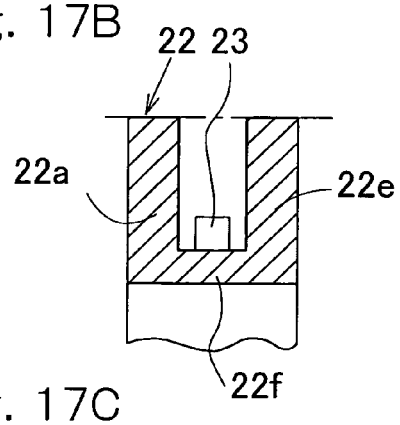
FIG. 17B is an enlarged view of the important portion of the sensor unit shown in FIG. 17A.

FIG. 15 to FIG. 17 show a fourth embodiment of the present invention. This embodiment has the same structural features as the first to the third embodiments other than the ring member 22 constituting the sensor unit 21, and thus same reference numerals are denoted for the common parts and the description thereof will be omitted.

As shown in FIG. 17, the transverse sectional shape of the ring member 22 is represented by a grooved shape having the contact ring portion 22a (the first contact ring portion 22a) and a contact ring portion 22e (a second contact ring portion 22e), each in contact with the inner peripheral surface of the outer member 1, and a non-contact ring portion (a first non-contact ring portion) 22f not in contact with the inner peripheral surface of the outer member 1. The non-contact ring portion 22f forms a bottom wall portion of the groove shape and the contact ring portions 22a and 22e form respective side wall portions on both sides of the groove shape. The contact ring portions 22a and 22e on both sides have a wall thickness greater than that of the non-contact ring portion 22f. Hereinbefore and hereinafter, the wall thickness of the non-contact ring portion 22f is referred to as the thickness in the radius direction and the wall thickness of the contact ring portions 22a and 22e is referred to as the thickness in the axial direction.

The strain sensors 23 for measuring an axial strain on the ring member 22 are affixed to the outer peripheral surface of the non-contact ring portion 22f, that is, the inner bottom surface of the ring member 22. The magnetic sensor 24 for rotation detection, which is of a type different from the strain sensor 23, is affixed to the inner peripheral surface of the non-contact ring portion 22f, and the magnetic encoder 25 serving as the to-be-detected member is attached to the outer peripheral surface of the inner member 2 facing the magnetic sensor 24.

In this embodiment, as described above, under the effect of a load acting on the hub axle 9, the outer member 1 is deformed through the rolling elements 5 and the deformation is transmitted to the ring member 22 fitted to the inner peripheral surface of the outer member 1, resulting in deformation of the ring member 22. The strain on the ring member 22 is measured by the strain sensors 23. In this case, the non-contact ring portion 22f is deformed mainly according to the deformation of the outer member 1 in the axial direction. On the other hand, since the contact ring portions 22a and 22e have a wall thickness greater than that of the non-contact ring portion 22f, the portions 22a and 22e have high rigidity and thus are hard to be deformed. Accordingly, an axial strain occurring on the non-contact ring portion 22f represents the transferred and enlarged axial strain on the inner peripheral surface of the outer member 1. Therefore, the measurement accuracy of the sensors 23 can be increased.

In this embodiment, as described in connection with the first to the third embodiments, the magnetic sensor 24 outputs the output signal every time the magnetic pole N or S of the magnetic encoder 25 passes the position confronting the magnetic sensor 24 with the rotation of the internal member 2. In this way the rotation of the internal member 2 can be detected.

Also, the outputs of the strain sensors 23 and the output of the magnetic sensor 24 can be processed by the sensor signal processing circuit shown in FIG. 5.

Figure 18:
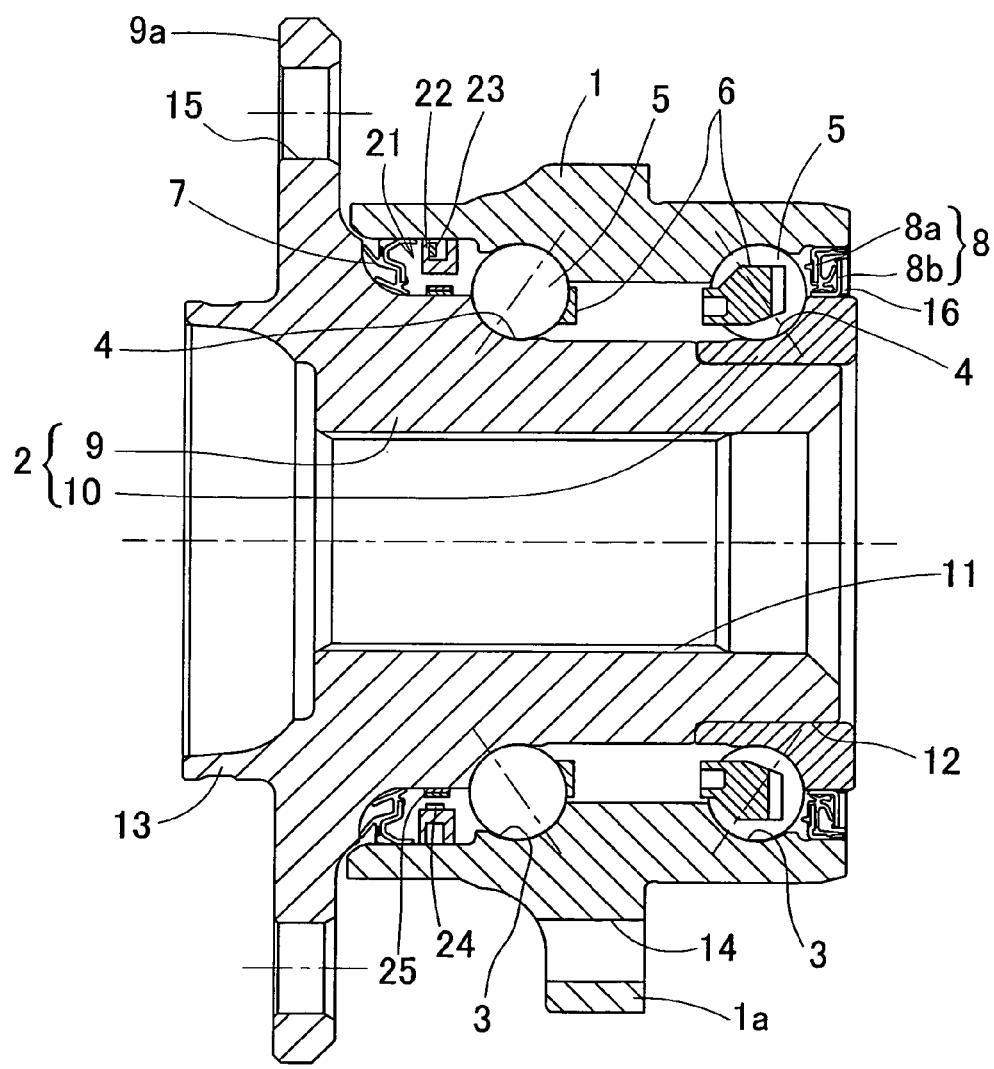
FIG. 18 is a longitudinal sectional view of a sensor-incorporated wheel support bearing assembly according to a fifth embodiment of the present invention.
Figure 19:
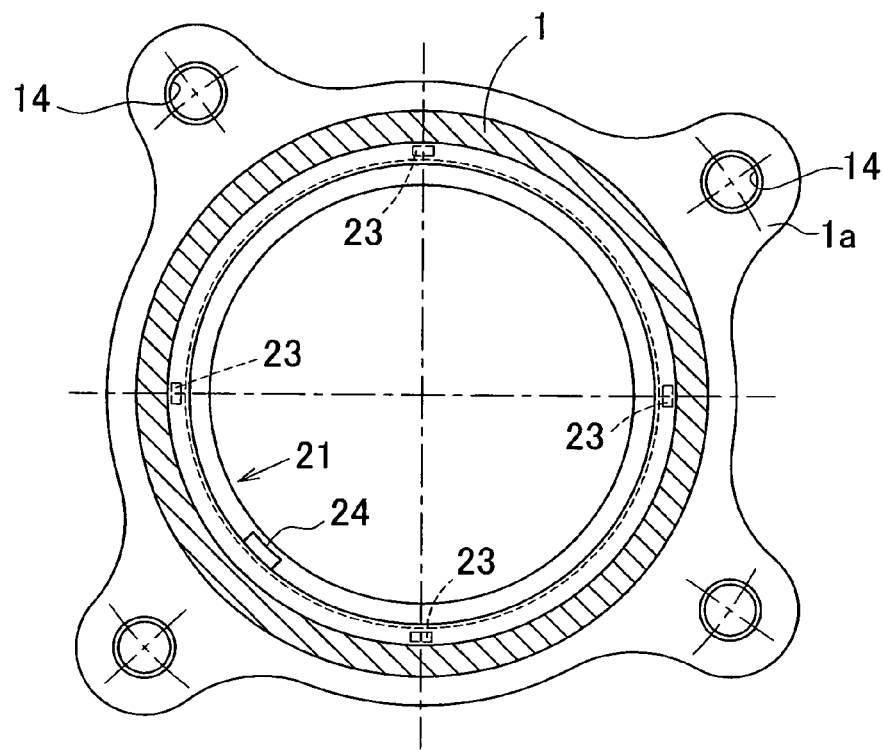
FIG. 19 is a partial sectional front view showing an outer member and a sensor unit of the sensor-incorporated wheel support bearing assembly according to the fifth, an eleventh, and a seventeenth embodiments of the present invention.
Figure 20A:
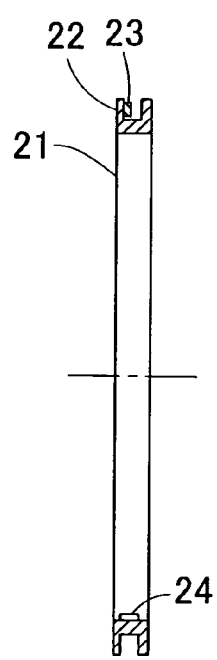
FIG. 20A is a transverse cross sectional view of the sensor unit employed in the sensor-incorporated wheel support bearing assembly according to the fifth, the eleventh, and the seventeenth embodiments of the present invention.
Figure 20B:
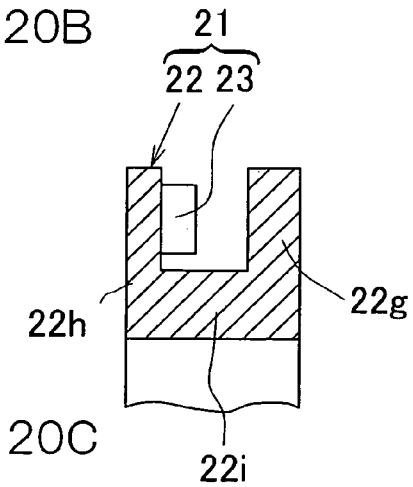
FIG. 20B is an enlarged view of the important portion of the sensor unit shown in FIG. 20A.

FIG. 18 to FIG. 20 show a fifth embodiment of the present invention. This embodiment has the same structural features as the first to the fourth embodiments other than the ring member 22 constituting the sensor unit 21, and thus same reference numerals are denoted for the common parts and the description thereof will be omitted.

As shown in FIG. 20, this fifth embodiment is similar to the forth embodiment in that the transverse sectional shape of the ring member 22 is represented by a grooved shape having a contact ring portion 22g (a first contact ring portion 22g) and a contact ring portion 22h (a second contact ring portion 22h), each in contact with the inner peripheral surface of the outer member 1, and a non-contact ring portion (a first non-contact ring portion) 22i not in contact with the inner peripheral surface of the outer member 1. However, in the ring member 22 of this embodiment, of the contact ring portions 22g and 22h on both sides, the contact ring portion 22g has a wall thickness greater than that of the contact ring portion 22h. The non-contact ring portion 22i has a wall thickness greater than those of the contact ring portions 22g and 22h.

The strain sensors 23 for measuring a strain on the ring member 22 in a bending direction are affixed to the inner surface of the contact ring portion 22h having a small wall thickness, that is, the surface opposed to the contact ring portion 22g. The magnetic sensor 24 for rotation detection, which is of a type different from the strain sensor 23, is affixed to the inner peripheral surface of the non-contact ring portion 22i, and the magnetic encoder 25 serving as the to-be-detected member is attached to the outer peripheral surface of the inner member 2 facing the magnetic sensor 24.

In this embodiment, as described above, under the effect of a load acting on the hub axle 9, the outer member 1 is deformed through the rolling elements 5 and the deformation is transmitted to the ring member 22 fitted to the inner peripheral surface of the outer member 1, resulting in deformation of the ring member 22. In the sensor unit 21 employed in this embodiment, the contact ring portion 22h having the strain sensor 23 affixed thereto is deformed mainly according to the deformation of the outer member 1 in the axial direction of. On the other hand, since the other contact ring portion 22g and the non-contact ring portion 22i have respective wall thickness greater than those of the contact ring portion 22h, the portions 22g and 22i have high rigidity and thus are hard to be deformed. Accordingly, a bending strain occurring on the contact ring portion 22h represents the transferred and enlarged axial strain on the inner peripheral surface of the outer member 1. Therefore, similar to the fourth embodiment, the strain measurement with high accuracy can be expected.

In this embodiment, as described in connection with the first to the fifth embodiments, the magnetic sensor 24 outputs an output signal every time the magnetic pole N or S of the magnetic encoder 25 passes the position confronting the magnetic sensor 24 with the rotation of the internal member 2. In this way the rotation of the internal member 2 can be detected.

Also, the outputs of the strain sensors 23 and the output of the magnetic sensor 24 can be processed by the sensor signal processing circuit shown in FIG. 5.

Figure 21:
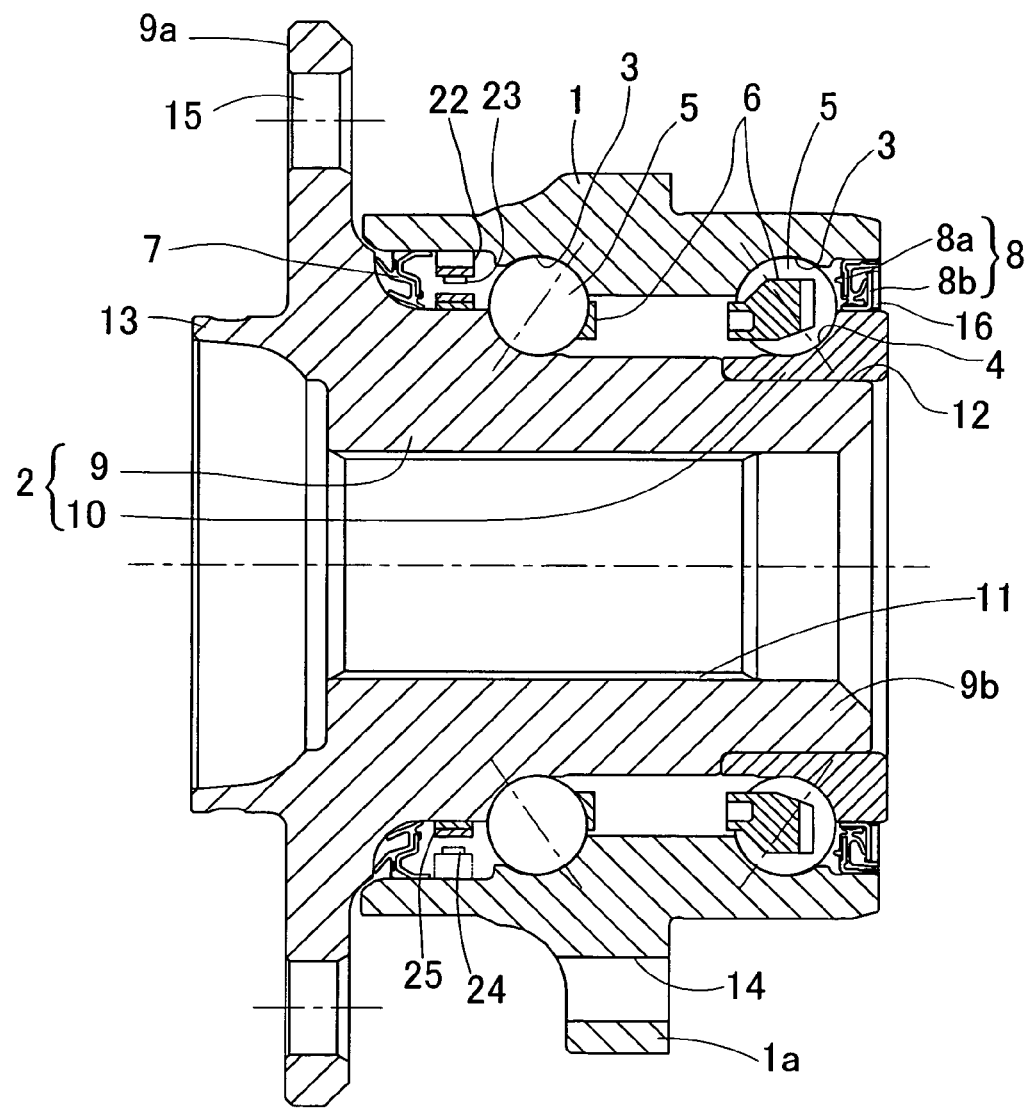
FIG. 21 is a longitudinal sectional view of a sensor-incorporated wheel support bearing assembly according to a sixth embodiment of the present invention.
Figure 22:
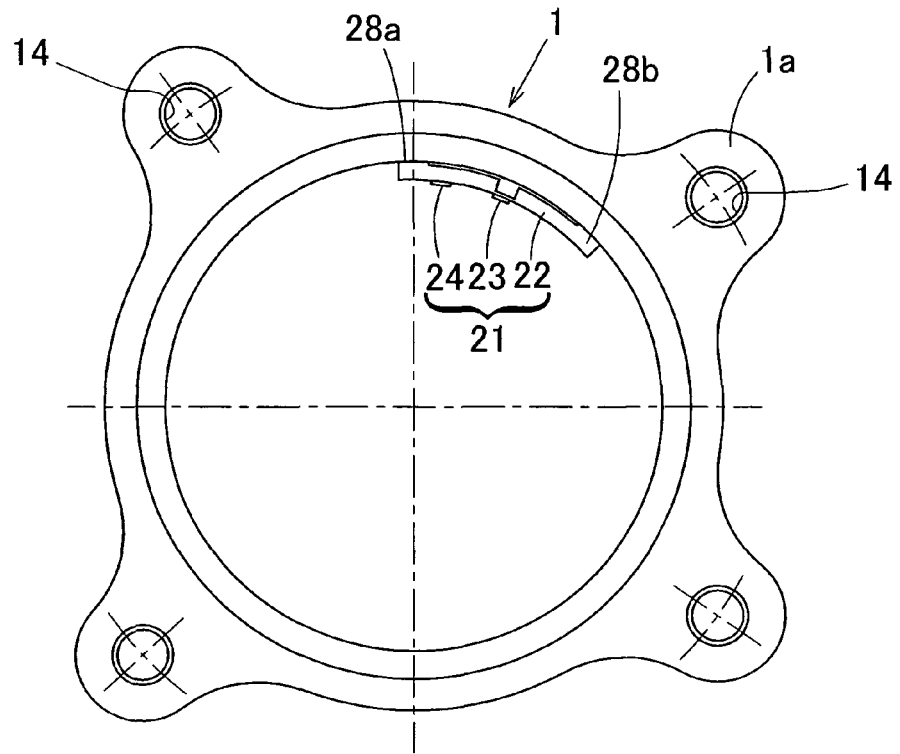
FIG. 22 is a front view showing an outer member and a sensor unit of the sensor-incorporated wheel support bearing assembly according to the sixth, a twelfth, and an eighteenth embodiments of the present invention.
Figure 23A:
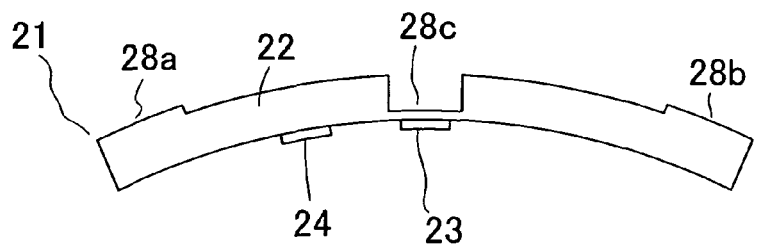
FIG. 23A is a partial front view of the sensor unit of the sensor-incorporated wheel support bearing assembly according to the sixth, the twelfth, and the eighteenth embodiments of the present invention.
Figure 23B:
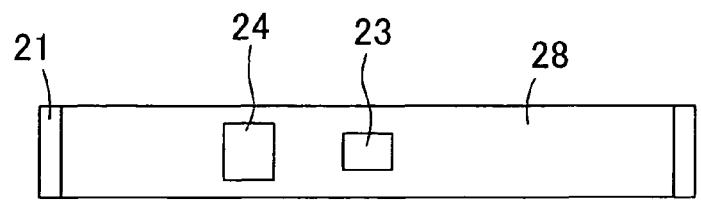
FIG. 23B is a bottom view of the sensor unit shown in FIG. 23A.

FIG. 21 to FIG. 23 show a sixth embodiment of the present invention. This embodiment differs from the first to the fifth embodiments in the structure of the sensor unit 21. The sensor unit 21 has the sensor mounting member 22 fitted to the surface of the outer member 1 at a portion in a circumferential direction thereof, the strain sensor 23 for measuring a strain on the sensor mounting member 22, which is affixed to the sensor mounting member 22, and the magnetic sensor 24 for detecting a rotation, which is of a type different from the strain sensor 23 and also affixed to the sensor mounting member 22. Other structural features of this embodiment are similar to those of the first to the fifth embodiments, and thus same reference numerals are denoted for the common parts and the description thereof will be omitted.

As shown in FIG. 23A, the sensor mounting member 22 has a substantially elongated arcuate shape corresponding to the shape of the inner peripheral surface of the outer member 1 and has contact fixing portions 28a and 28b protruding from the outer peripheral surface of the arcuate shape are formed at opposite ends. The sensor mounting member also has an intermediate portion formed as a notch portion 28c opened to the outer peripheral side of the arcuate shape. The strain sensor 23 is affixed to the inner peripheral surface of the sensor mounting member 22 positioned on a back side of the notch portion 28c. The magnetic sensor 24 for detecting a rotation, which is of a type different from the strain sensor 23, is affixed to the inner peripheral surface of the sensor mounting member 22 at a position shifted in the peripheral direction from the strain sensor 23. The sectional shape of the sensor mounting member 22 is represented by rectangular and also have various other shapes.

The sensor unit 21 is fixed on the inner peripheral surface of the outer member 1 through the contact fixing portions 28a and 28b of the sensor mounting member 22 so that the longitudinal direction of the sensor mounting member 22 lies along the peripheral direction of the outer member 1. The fixation of the contact fixing portions 28a and 28b to the outer member 1 may be fixation by bolts, adherence by adhesive, and the like. A clearance is defined between the inner peripheral surface of the outer member 1 and a portion of the sensor mounting member 22 other than the contact fixing portions 28a and 28b. The first contact fixing portion 28a, which is one of the contact fixing portions 28a and 28b, is fixed to a portion of outer member 1 at where the outer member 1 is deformed most largely in a radial direction under the load acting on the outer member 1 of portions in the peripheral direction. The second contact fixing portion 28b is fixed to a portion of the outer member 1 at where the outer member 1 is deformed radially less than the portion to which the first contact fixing portion 28a is fixed.

The magnetic encoder 25 serving as the to-be-detected member is affixed to the outer peripheral surface of the inner member 2 in face-to-face relation with the magnetic sensor 24.

In the present embodiment, under the effect of a load acting on the hub axle 9, the outer member 1 is deformed through the rolling elements 5 and the deformation is transmitted to the sensor mounting member 22 fixed to the inner peripheral surface of the outer member 1, resulting in deformation of the sensor mounting member 22. The deformation or a strain on the sensor mounting member 22 is measured with the strain sensor 23. In this case, the sensor mounting member 22 is deformed according to the radial deformation in the outer member 1 at a portion to which the sensor mounting member 22 is fitted. Since the sensor mounting member 22 has the arcuate shape and the notch portion 28c is formed so that the rigidity lowers at the portion of the notch portion 28c, the strain larger than that on the outer member 1 appears in the portion to which the sensor mounting member 22 is fitted. Therefore, any slight strain on the outer member 1 can be accurately detected by the strain sensor 23.

In this embodiment, as described in connection with the first to the sixth embodiments, the magnetic sensor 24 outputs an output signal every time the magnetic pole N or S of the magnetic encoder 25 passes the position confronting the magnetic sensor 24 with the rotation of the internal member 2. In this way, the rotation of the internal member 2 can be detected.

Also, the outputs of the strain sensors 23 and the output of the magnetic sensor 24 can be processed by the sensor signal processing circuit shown in FIG. 5.

Figure 24:
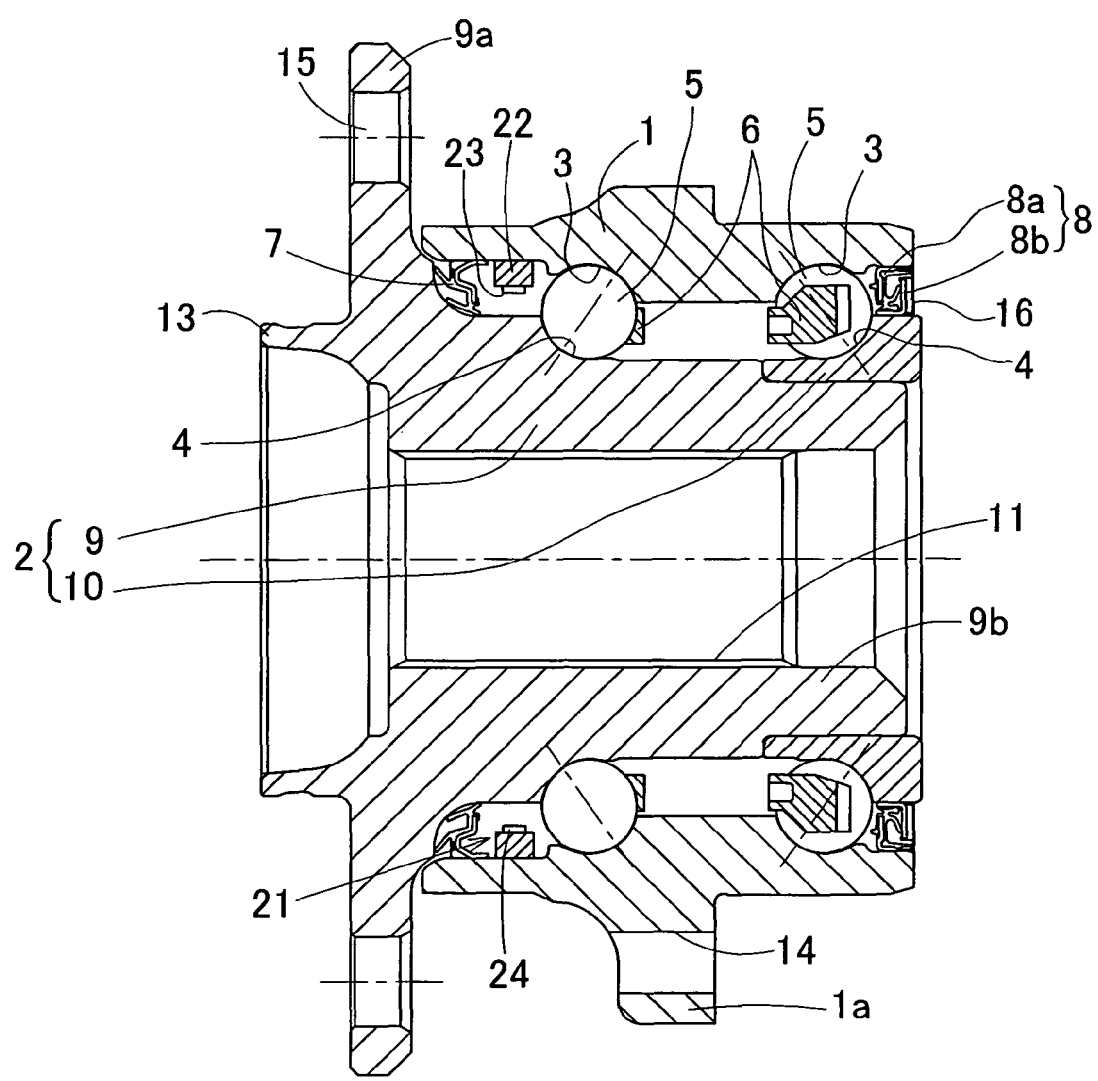
FIG. 24 is a longitudinal sectional view of a sensor-incorporated wheel support bearing assembly according to the seventh embodiment of the present invention.

A seventh embodiment of the present invention will now be described with reference to FIGS. 24 and 25, as well as FIGS. 2 and 3 referenced in the first embodiment. In this embodiment, description of parts common with the first embodiment will be omitted.

In the seventh embodiment, the sensor unit 21, provided on the inner peripheral surface of the outer member 1 at the outboard end thereof, includes the ring member (sensor mounting member) 22, the plurality of strain sensors 23 affixed to the ring member 22, for measuring a strain on the ring member 22, and a temperature sensor 24 of a type different from the strain sensors 23, also affixed to the ring member 22 for measuring a temperature of the ring member 22. That is, the strain sensors 23 and the magnetic sensor 24 are provided on the ring member 22 in the first embodiment, whereas the strain sensors 23 and the temperature sensor 24 are provided on the ring member 22 in this seventh embodiment. As shown in FIG. 2, the strain sensors 23 are equally spaced in a direction circumferentially of the inner peripheral surface of the ring member 22, in this embodiment, four strain sensors 23 positioned on upward side, down ward side, leftward side and right ward side, respectively, of the wheel support bearing assembly. The temperature sensor 24 is affixed to the ring member 22 at the inner peripheral surface thereof and positioned between a pair of strain sensors 23 and 23 adjacent in a circumferential direction thereof. The position to which the temperature sensor 24 is affixed is not limited to the above-mentioned position. In this embodiment, the cross sectional shape of the ring member 22 is a rectangle.

The sealing device 8 on the inboard side includes a seal 8a fitted to the inner peripheral surface of the outer member 1, made of an elastic member such as rubber having a core member, and a slinger 8b fitted to the outer peripheral surface of the inner race 10, with which the seal 8a contacts. As different from the first embodiment, the magnetic sensor and the magnetic encoder are not fitted to the ring member 22. And the slinger 8b is provided with a magnetic encoder 16 for detecting a rotation made up of a multipolar magnet having a plurality of magnetic poles alternating in the direction circumferentially thereof. A magnetic sensor (not shown) is fitted to the outer member 1 so as to confront the magnetic encoder 16.

Figure 25:
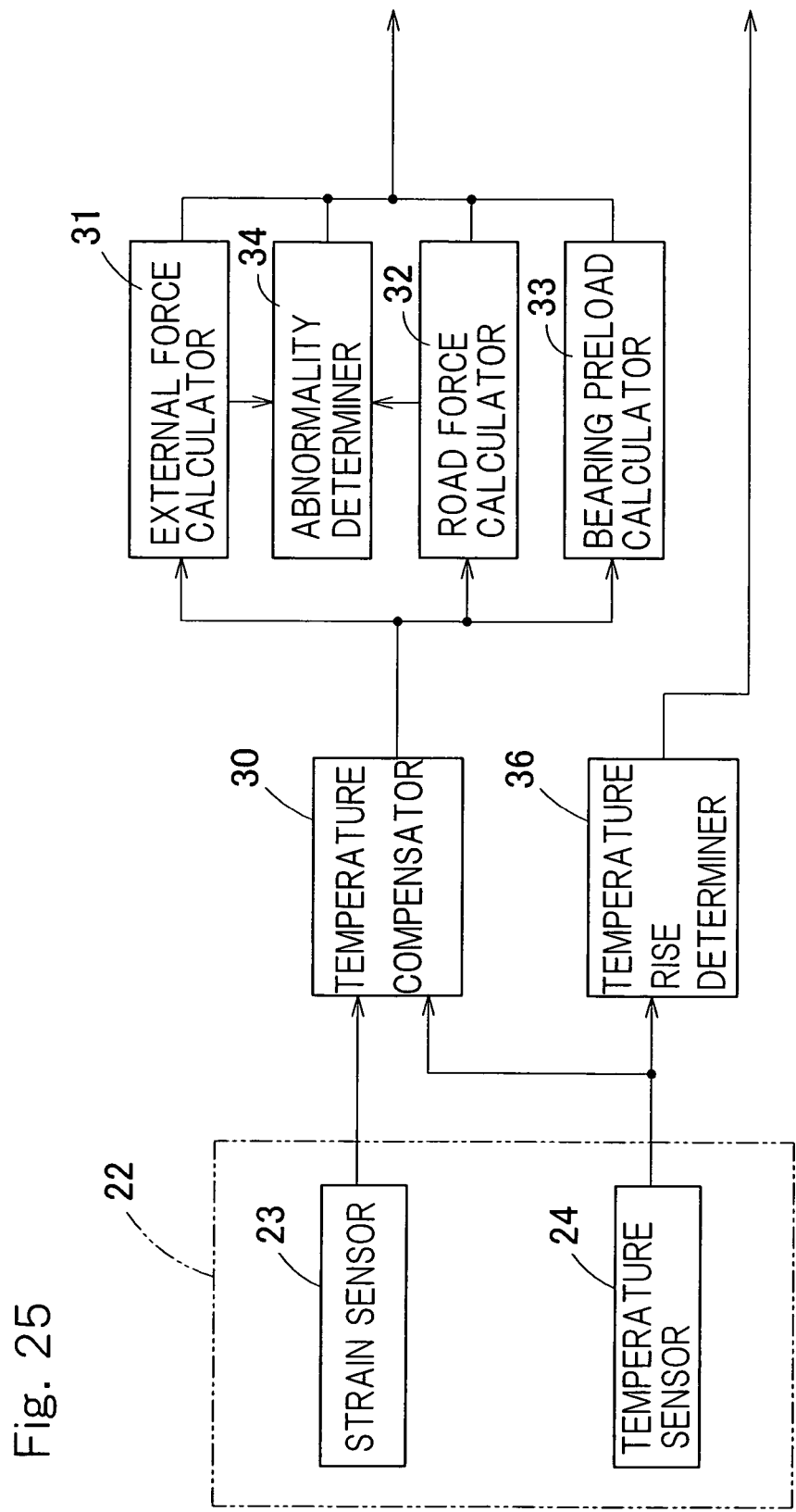
FIG. 25 is a block diagram showing a conceptual structure of a load detecting system for the seventh to the twelfth embodiments of the present invention.

As shown in FIG. 25, the strain sensor 23 and the temperature sensor 24 are connected to the input side of a temperature compensator 30, and the external force calculator 31, the road force calculator 32, the bearing preload calculator 33, and the abnormality determiner 34 are connected to the output side of the temperature compensator 30. The temperature sensor 24 is also connected to a temperature rise determiner 36. Each unit 30 to 34 and 36 may be provided in the electronic circuit device (not shown) such as a circuit board fitted to, for example, the outer member 1 of the wheel support bearing assembly or in the electric control unit (ECU) of the automotive vehicle.

The operation of the sensor-incorporated wheel support bearing assembly having the above-mentioned structure will be described focusing only on the steps different from the first embodiment. Under the effect of a load acting on the hub axle 9, the outer member 1 is deformed through the rolling elements 5 and the deformation of the outer member 1 is transmitted to the ring member 22 fitted to the inner peripheral surface of the outer member 1, resulting in deformation of the ring member 22. The deformation of or a strain on the ring member 22 is measured with the strain sensors 23. The outputs of the strain sensors 23 are sent to the temperature compensator 30. The temperature compensator 30 compensates for the temperature characteristics of the strain sensors 23 based on the output from the temperature sensor 24. The outputs of the strain sensors 23 compensated in this manner are used for the following control.

Changes in the strain are different depending on the direction or the magnitude of the load. By determining the relation between the strain and the load in advance from experiments and simulations, the external force acting on the wheel support bearing assembly or the road force acting between the tire and the road surface can be calculated. The external force calculator 31 and the road force calculator 32 calculate the external force acting on the wheel support bearing assembly and the road force acting between the tire and the road surface, respectively, from the outputs of the strain sensors 23, based on the relation between the strain and the load which has been predetermined from experiments and simulations. An accurate value of the external force or the road force without influence of temperature can be calculated since the outputs of the strain sensors 23, in which the temperature characteristic are compensated, are used.

Furthermore, since the preload is imposed on the wheel support bearing assembly through the inner race 10, the ring member 22 is deformed by the effect of such preload. For this reason, by determining the relation between the strain and the preload in advance from experiments and simulations, the condition of the preload in the wheel support bearing assembly can be ascertained. The bearing preload calculator 33 is utilized to output a bearing preload through output of the strain sensor 23 based on the relation between the strain and the preload which has been predetermined from experiments and simulations. Again, an accurate bearing preload without influence of temperature can be outputted since the outputs of the strain sensors 23, in which the temperature characteristics are compensated, are used. In addition, when the preload outputted from the bearing preload calculator 33 is utilized, the preload to be applied during assembling of the wheel support bearing assembly can be easily adjusted.

The temperature of the ring member 22 and the temperature inside the wheel support bearing assembly will not greatly differ since the sensor unit 21 is provided inside an annular bearing space sealed from the outside by the sealing devices 7, 8. Therefore, the temperature detected by the temperature sensor 24 can be assumed as the temperature inside the wheel support bearing assembly. The output of the temperature sensor 24 is sent to the temperature rise determiner 36, which determines on whether or not the temperature inside the wheel support bearing assembly is higher than that in normal use. When determined as high, an abnormality signal is outputted assuming that defects have occurred in the wheel support bearing assembly. The attention of the driver then can be drawn to the defects.

Figure 11C:
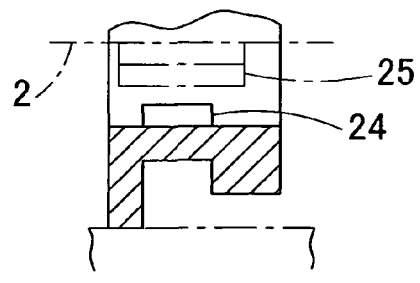
FIG. 11C is an enlarged view of another important portion of the sensor unit shown in FIG. 11A.
Figure 26:
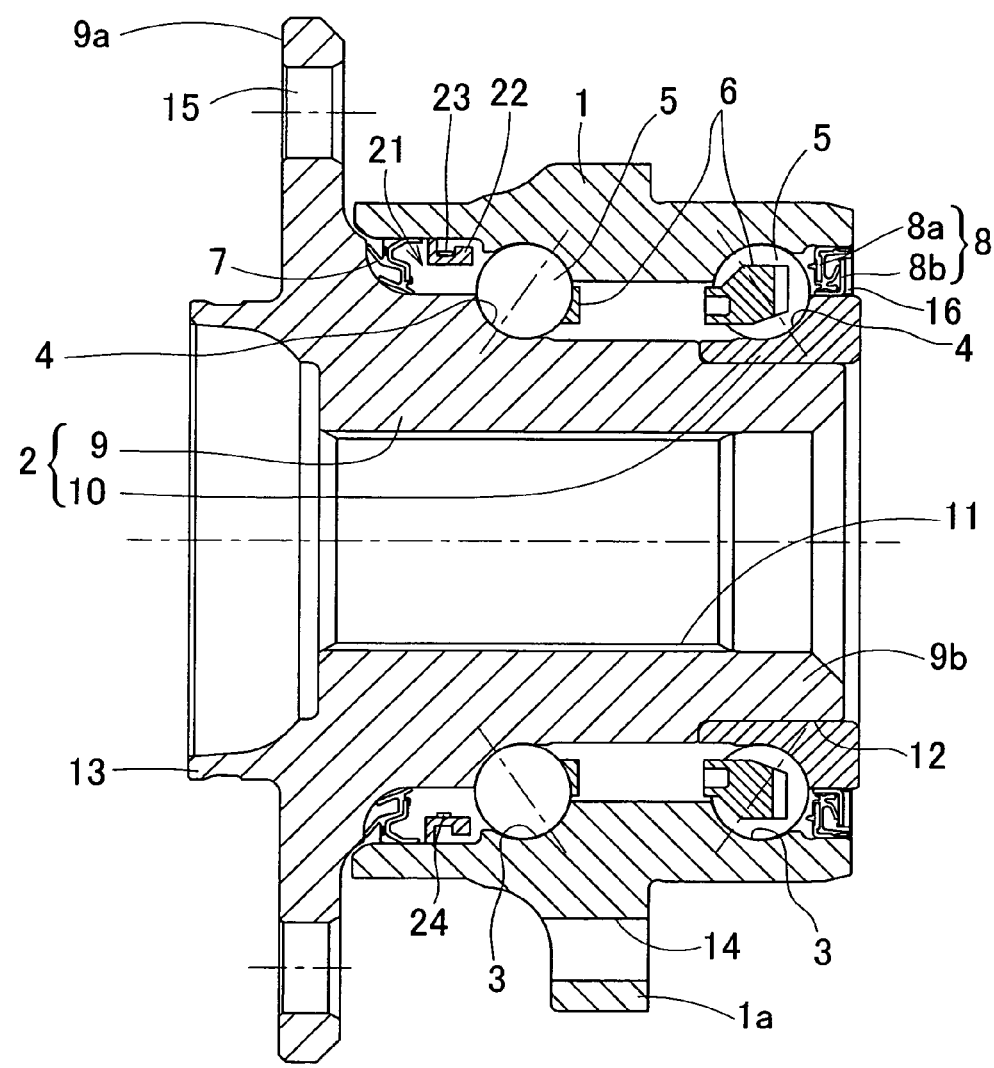
FIG. 26 is a longitudinal sectional view of a sensor-incorporated wheel support bearing assembly according to the eighth embodiment of the present invention.

An eighth embodiment of the present invention will now be described with reference to FIG. 26, as well as FIGS. 10 and 11 referenced in the second embodiment. The magnetic encoder 25 is shown in FIG. 11C referenced in the second embodiment, but the magnetic encoder 25 does not appear in FIG. 11C in the eighth embodiment and thus reference is made omitting the magnetic encoder 25 in FIG. 11C. This embodiment is similar to the second embodiment in the shape of the ring member 22 constituting the sensor unit 21, and also similar to the seventh embodiment in the temperature sensor 24 of a different type from the strain sensors 23 affixed to the ring member 22 with the strain sensors 23, and thus same reference numerals are denoted for the common parts and the description thereof will be omitted.

In this embodiment, as described in connection with the second embodiment, the strain sensors 23 for measuring the axial strain on the ring member 22 are affixed to the outer peripheral surface of the non-contact ring portion 22b formed at an intermediate portion between the contact ring portion 22a and the thick-walled portion 22c (the bottom portion of a recess groove shaped portion between the contact ring portion 22a and the thick-walled portion 22c). The temperature sensor 24 for measuring the temperature of the ring member 22, which is of a type different from the strain sensor 23, is affixed to the inner peripheral surface of the ring member 22.

Also, under the effect of a load acting on the hub axle 9, the outer member 1 is deformed through the rolling elements 5 and the deformation of the outer member 1 is transmitted to the ring member 22 fitted to the inner peripheral surface of the outer member 1, resulting in deformation of the ring member 22. The deformation or a strain on the ring member 22 is measured with the strain sensors 23. The outputs of the strain sensors 23 are sent to the temperature compensator 30. The temperature compensator 30 compensates for the temperature characteristics of the strain sensors 23 based on the output from the temperature sensor 24.

In this embodiment, as described above in connection with the seventh embodiment, the outputs of the strain sensors 23 and the output of the magnetic sensor 24 may be processed by each unit of the load detecting system shown in FIG. 25.

Figure 14C:
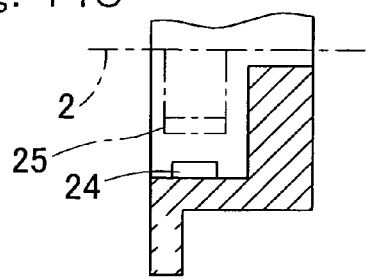
FIG. 14C is an enlarged view of another important portion of the sensor unit shown in FIG. 14A.
Figure 27:
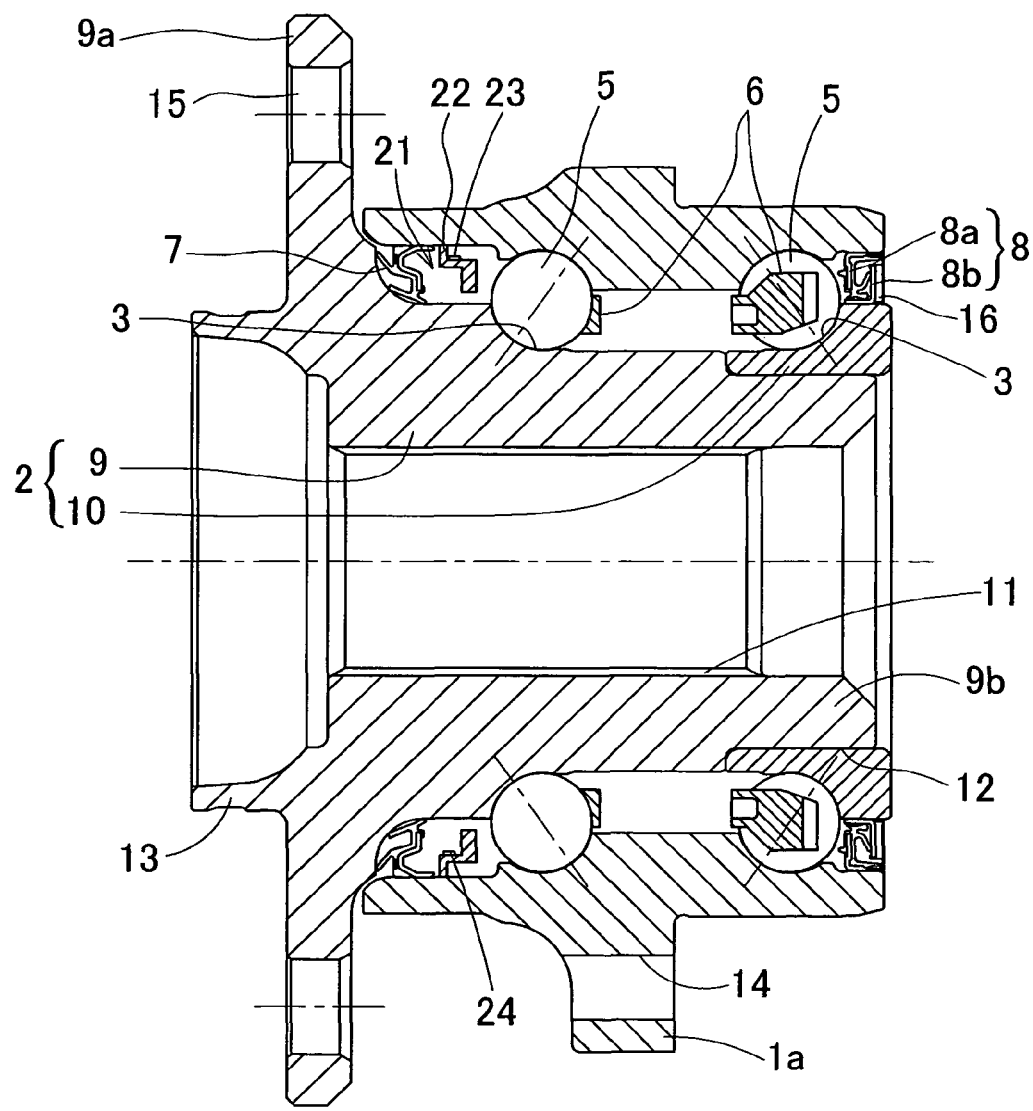
FIG. 27 is a longitudinal sectional view of a sensor-incorporated wheel support bearing assembly according to the ninth embodiment of the present invention.

A ninth embodiment of the present invention will now be described with reference to FIG. 27, as well as FIGS. 13 and 14 referenced in the third embodiment. The magnetic encoder 25 is shown in FIG. 14C referenced in the third embodiment, but the magnetic encoder 25 does not appear in FIG. 14C in the ninth embodiment and thus reference is made omitting the magnetic encoder 25 in FIG. 14C. This embodiment is similar to the third embodiment in the shape of the ring member 22 constituting the sensor unit 21, and also similar to the seventh and the eighth embodiments in the temperature sensor 24 of a different type from the strain sensor 23 affixed to the ring member 22 with the strain sensors 23, and thus same reference numerals are denoted for the common parts and the description thereof will be omitted.

In this embodiment, as described in connection with the third embodiment, the strain sensors 23 for measuring an axial strain on the ring member 22 are affixed to the outer peripheral surface of the non-contact ring portion 22b between the contact ring portion 22a and the flange portion 22d (the outer peripheral surface of a cylindrical portion between the contact ring portion 22a and the flange portion 22d). The temperature sensor 24 for measuring the temperature of the ring member 22, which is of a type different from the strain sensor 23, is affixed to the inner peripheral surface of the ring member 22.

In this embodiment, as described in connection with the seventh and eighth embodiments, under the effect of a load acting on the hub axle 9, the outer member 1 is deformed through the rolling elements 5 and the deformation of the outer member 1 is transmitted to the ring member 22 fitted to the inner peripheral surface of the outer member 1, resulting in deformation of the ring member 22. The deformation or a strain on the ring member 22 is measured with the strain sensors 23. The outputs of the strain sensors 23 are sent to the temperature compensator 30. The temperature compensator 30 compensates for the temperature characteristics of the strain sensors 23 based on the output from the temperature sensor 24.

Figure 17C:
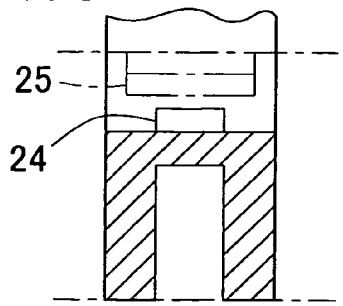
FIG. 17C is an enlarged view of another important portion of the sensor unit shown in FIG. 17A.
Figure 28:
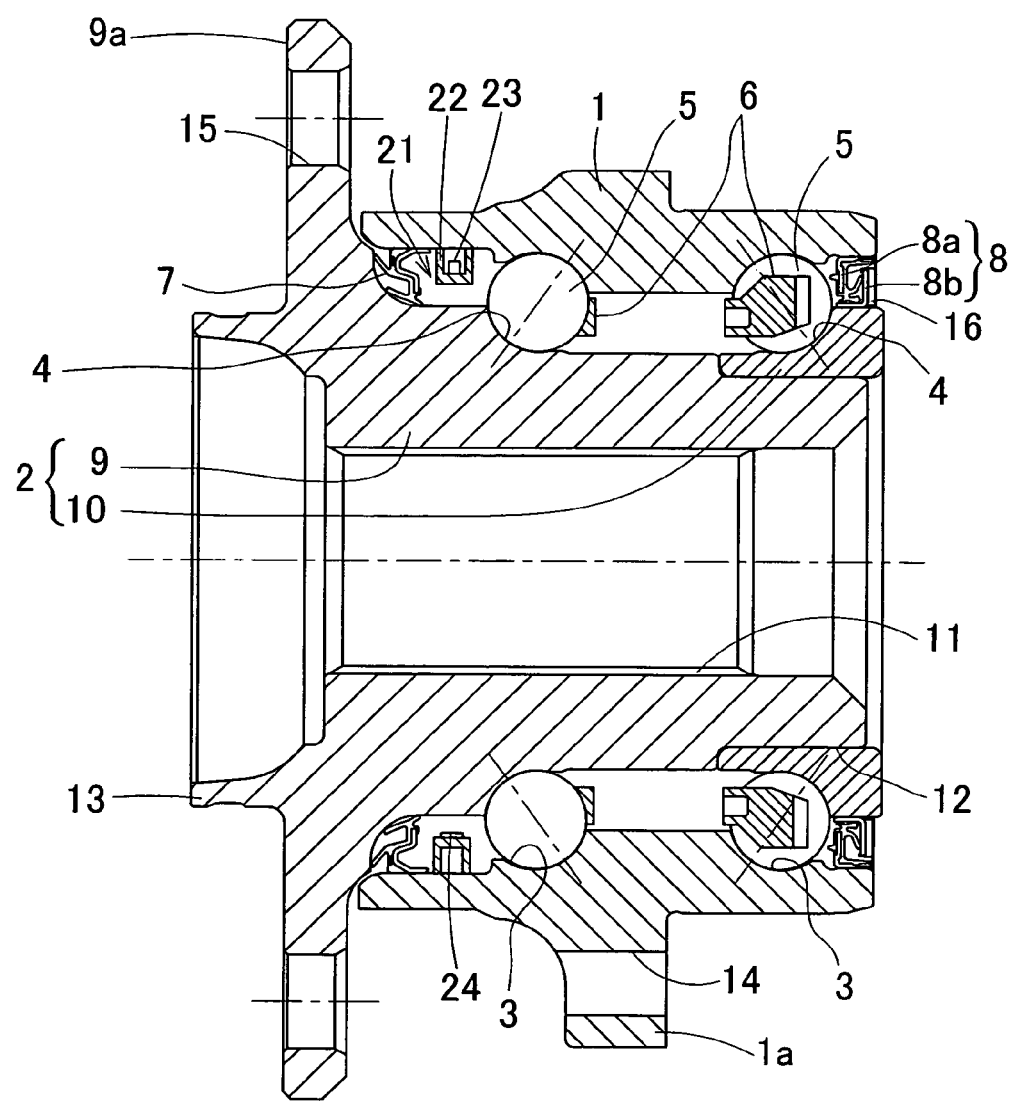
FIG. 28 is a longitudinal sectional view of a sensor-incorporated wheel support bearing assembly according to the tenth embodiment of the present invention.

A tenth embodiment of the present invention will now be described with reference to FIG. 28, as well as FIGS. 16 and 17 referenced in the fourth embodiment. The magnetic encoder 25 is shown in FIG. 17C referenced in the fourth embodiment, but the magnetic encoder 25 does not appear in FIG. 17C in the tenth embodiment and thus reference is made omitting the magnetic encoder 25 in FIG. 17C. This embodiment is similar to the fourth embodiment in the shape of the ring member 22 constituting the sensor unit 21, and also similar to the seventh to the ninth embodiments in the temperature sensor 24 of a different type from the strain sensor 23 affixed to the ring member 22 with the strain sensor 23, and thus same reference numerals are denoted for the common parts and the description thereof will be omitted.

As described in connection with the fourth embodiment, the strain sensors 23 for measuring the axial strain on the ring member 22 are affixed to the outer peripheral surface of the non-contact ring portion 22f, that is, the inner bottom surface of the ring member 22. The temperature sensor 24 for measuring the temperature of the ring member 22, which is of a type different from the strain sensor 23, is affixed to the inner peripheral surface of the ring member 22.

In this embodiment, as described above in connection with the seventh to the ninth embodiments, under the effect of a load acting on the hub axle 9, the outer member 1 is deformed through the rolling elements 5 and the deformation is transmitted to the ring member 22 fitted to the inner peripheral surface of the outer member 1, resulting in deformation of the ring member 22. The deformation or a strain on the ring member 22 is measured with the strain sensors 23. The outputs of the strain sensors 23 are sent to the temperature compensator 30. The temperature compensator 30 compensates for the temperature characteristics of the strain sensors 23 based on the output from the temperature sensor 24.

Figure 20C:
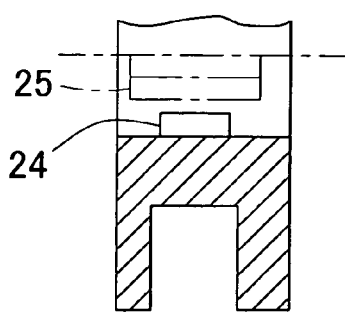
FIG. 20C is an enlarged view of another important portion of the sensor unit shown in FIG. 20A.
Figure 29:
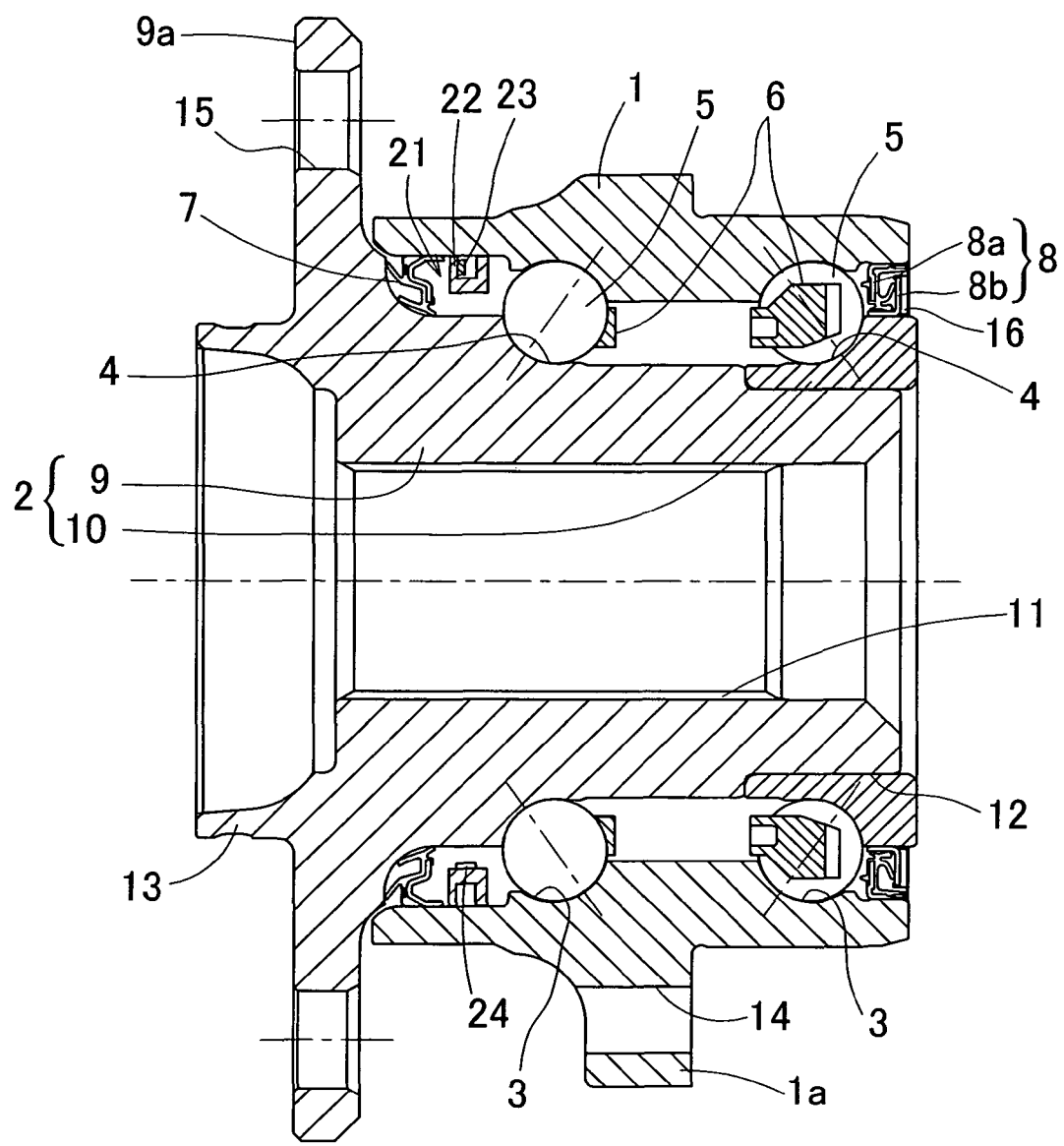
FIG. 29 is a longitudinal sectional view of a sensor-incorporated wheel support bearing assembly according to the eleventh embodiment of the present invention.

An eleventh embodiment of the present invention will now be described with reference to FIG. 29, as well as FIGS. 19 and 20 referenced in the fifth embodiment. The magnetic encoder 25 is shown in FIG. 20C referenced in the fifth embodiment, but the magnetic encoder 25 does not appear in FIG. 20C in the eleventh embodiment and thus reference is made omitting the magnetic encoder 25 in FIG. 20C. This embodiment is similar to the fifth embodiment in the shape of the ring member 22 constituting the sensor unit 21, and also similar to the seventh to the tenth embodiments in the temperature sensor 24 of a different type from the strain sensor 23 affixed to the ring member 22 with the strain sensors 23, and thus same reference numerals are denoted for the common parts and the description thereof will be omitted.

As described in connection with the fifth embodiment, the strain sensors 23 for measuring a strain on the ring member 22 in a bending direction are affixed to the inner surface of the contact ring portion 22h having a small wall thickness, that is, the surface opposed to the contact ring portion 22g. The temperature sensor 24 for measuring the temperature of the ring member 22, which is of a type different from the strain sensor 23, is affixed to the inner peripheral surface of the ring member 22.

In this embodiment, as described in connection with the seventh to the tenth embodiments, under the effect of a load acting on the hub axle 9, the outer member 1 is deformed through the rolling elements 5 and the deformation is transmitted to the ring member 22 fitted to the inner peripheral surface of the outer member 1, resulting in deformation of the ring member 22. The deformation or a strain on the ring member 22 is measured with the strain sensors 23. The outputs of the strain sensors 23 are sent to the temperature compensator 30. The temperature compensator 30 compensates for the temperature characteristics of the strain sensors 23 based on the output from the temperature sensor 24.

Figure 30:
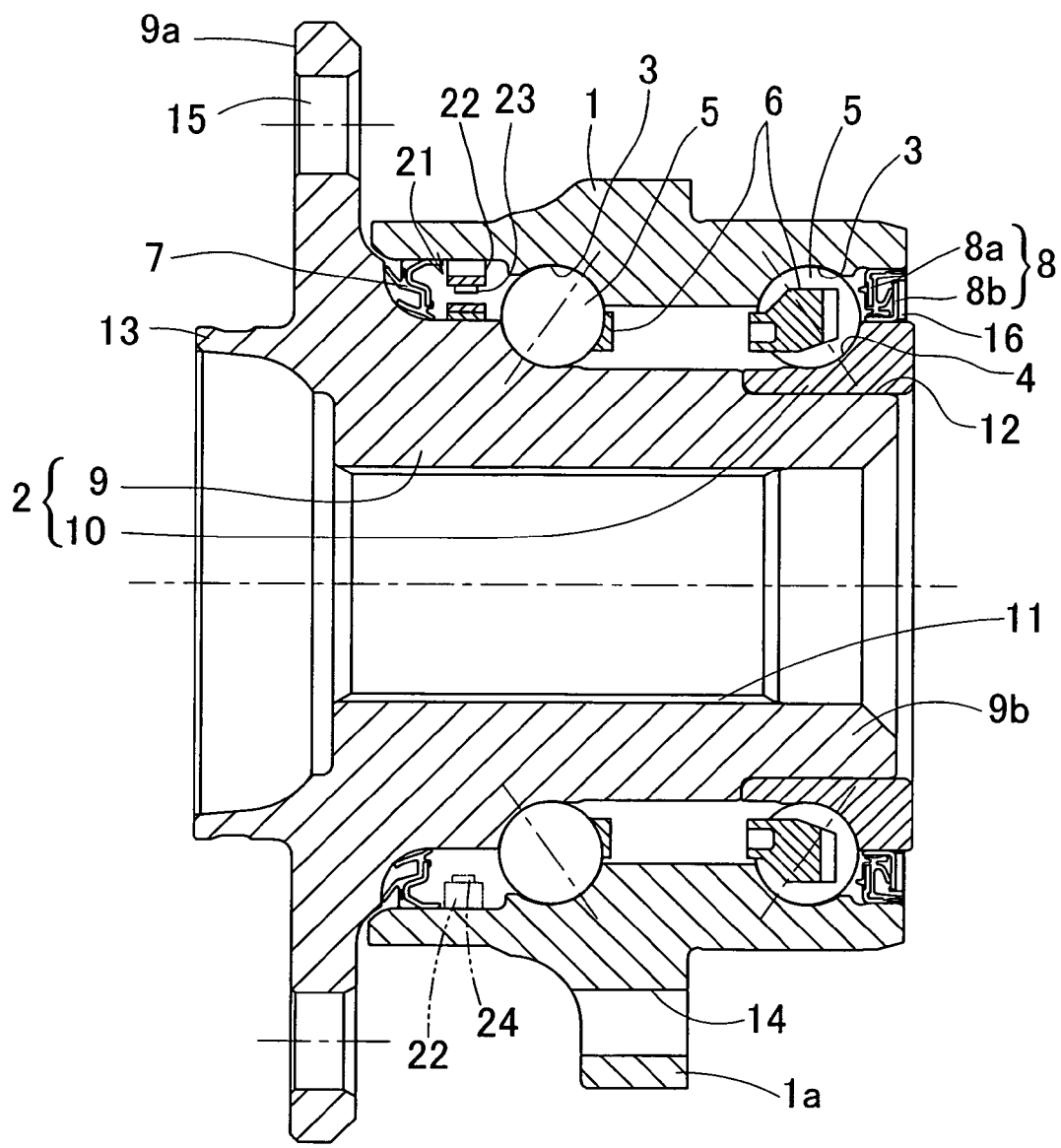
FIG. 30 is a longitudinal sectional view of a sensor-incorporated wheel support bearing assembly according to the twelfth embodiment of the present invention.

A twelfth embodiment of the present invention will now be described with reference to FIG. 30, as well as FIGS. 22 and 23 referenced in the sixth embodiment. This embodiment is similar to the sixth embodiment in the structure of the sensor unit 21, and also similar to the seventh to the eleventh embodiments in the temperature sensor 24 of a different type from the strain sensor 23 affixed to the sensor mounting member 22 with the strain sensor 23, and thus same reference numerals are denoted for the common parts and the description thereof will be omitted.

In this embodiment, as described in connection with sixth embodiment, the sensor mounting member 22 has an intermediate portion formed as a notch portion 28c opened to the outer peripheral side of the arcuate shape. The strain sensor 23 is affixed to the inner peripheral surface of the sensor mounting member 22 positioned on a back side of the notch portion 28c. The temperature sensor 24, which is of a type different from the strain sensor 23, is affixed to the inner peripheral surface of the sensor mounting member 22 at a position shifted in the peripheral direction from the strain sensor 23.

In this embodiment, under the effect of a load acting on the hub axle 9, the outer member 1 is deformed through the rolling elements 5 and the deformation of the outer member 1 is transmitted to the sensor mounting member 22 fitted to the inner peripheral surface of the outer member 1, resulting in deformation of the sensor mounting member 22. The deformation or a strain on the sensor mounting member 22 is measured with the strain sensor 23.

Also, the output of the strain sensors 23 and the output of the magnetic sensor 24 may be processed by each unit of the load detecting system shown in FIG. 25.

A thirteenth embodiment of the present invention will now be described with reference to FIG. 31, as well as FIGS. 2 and 3 referenced in the first embodiment, and FIG. 24 referenced in the seventh embodiment. In this embodiment, description of parts common with the first and the seventh embodiments will be omitted.

In the thirteenth embodiment, the sensor unit 21, provided on the inner peripheral surface of the outer member 1 at the outboard end thereof, includes the ring member (sensor mounting member) 22, the plurality of strain sensors 23 affixed to the ring member 22, for measuring a strain on the ring member 22, and a status detecting sensor 24 of a different type from the strain sensors 23, affixed to the ring member 22, for detecting one of different status of the wheel support bearing assembly other than a strain. The status detecting sensor 24 may be at least one of an acceleration sensor for detecting the acceleration of the rotation, a vibration sensor for detecting the vibration of the outer member 1, and a moisture sensor for detecting whether moisture is present in the bearing assembly space. In other words, the strain sensors 23 and the magnetic sensor 24 are provided on the ring member 22 in the first embodiment and the strain sensors 23 and the temperature sensor 24 are provided on the ring member 22 in the seventh embodiment, whereas the strain sensor 23 and the status detecting sensor 24 are provided on the ring member 22 in the thirteenth embodiment.

Figure 2:
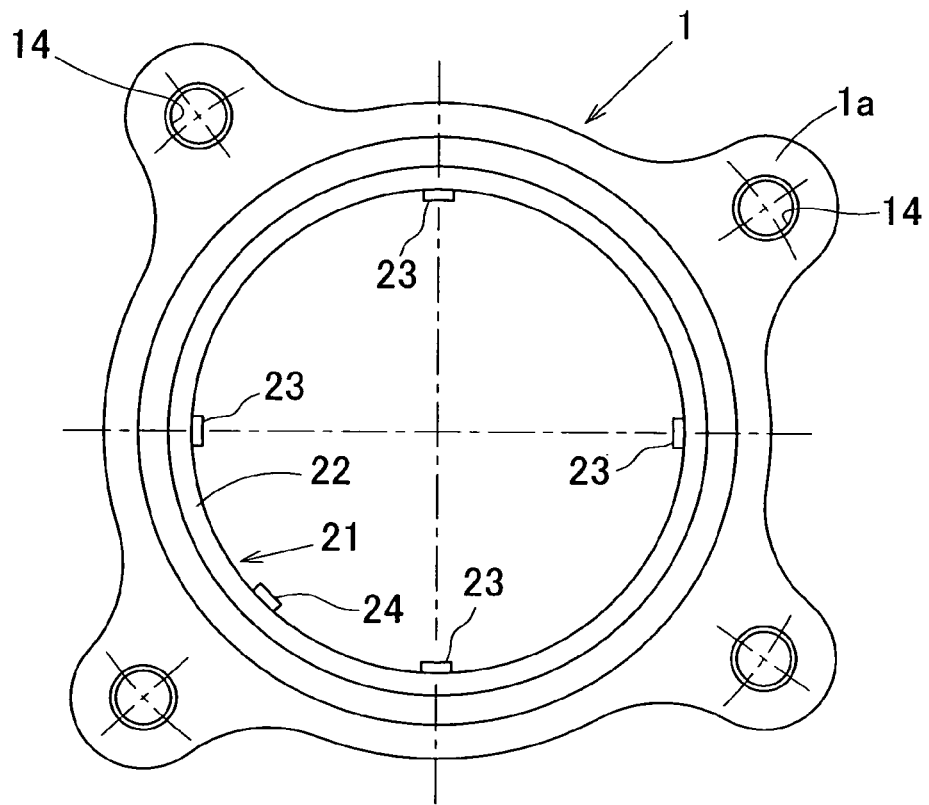
FIG. 2 is a front view showing an outer member and a sensor unit of the sensor-incorporated wheel support bearing assembly according to the first, a seventh and a thirteenth embodiments of the present invention.
Figure 3:
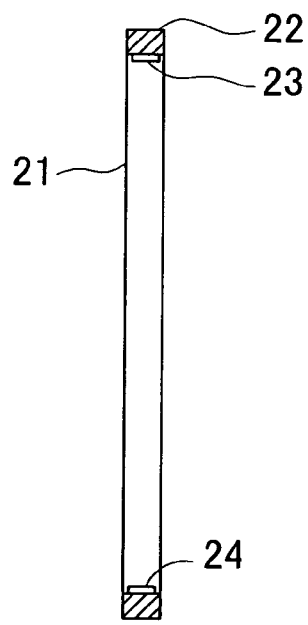
FIG. 3 is a transverse cross sectional view of the sensor unit employed in the first, the seventh and the thirteenth embodiments of the present invention.

As shown in FIG. 2, the strain sensors 23 are equally spaced in a direction circumferentially of the inner peripheral surface of the ring member 22 and, in this embodiment, four strain sensors 23 are positioned on upward side, downward side, leftward side and rightward side, respectively, of the wheel support bearing assembly. The status detecting sensor 24 is also affixed to the ring member 22 at the inner peripheral surface thereof, and positioned between a pair of adjacent strain sensors 23 and 23 along a circumferential direction thereof. The position to which the status detecting sensor 24 is affixed is not limited to the above-mentioned position. In this embodiment, the cross sectional shape of the ring member 22 is a rectangle.

The sealing device 8 on the inboard side includes a seal 8a fitted to the inner peripheral surface of the outer member 1, made of an elastic member such as rubber having a core member, and a slinger 8b fitted to the outer peripheral surface of the inner race 10, with which the seal 8a contacts. As different from the first embodiment, the magnetic sensor and the magnetic encoder are not fitted to the ring member 22. And the slinger 8b is provided with a magnetic encoder 16 for detecting a rotation made up of a multipolar magnet having a plurality of magnetic poles alternating in the direction circumferentially thereof, as similar to the seventh embodiment. A magnetic sensor not (shown) is fitted to the outer member 1 so as to confront the magnetic encoder 16.

Figure 31:
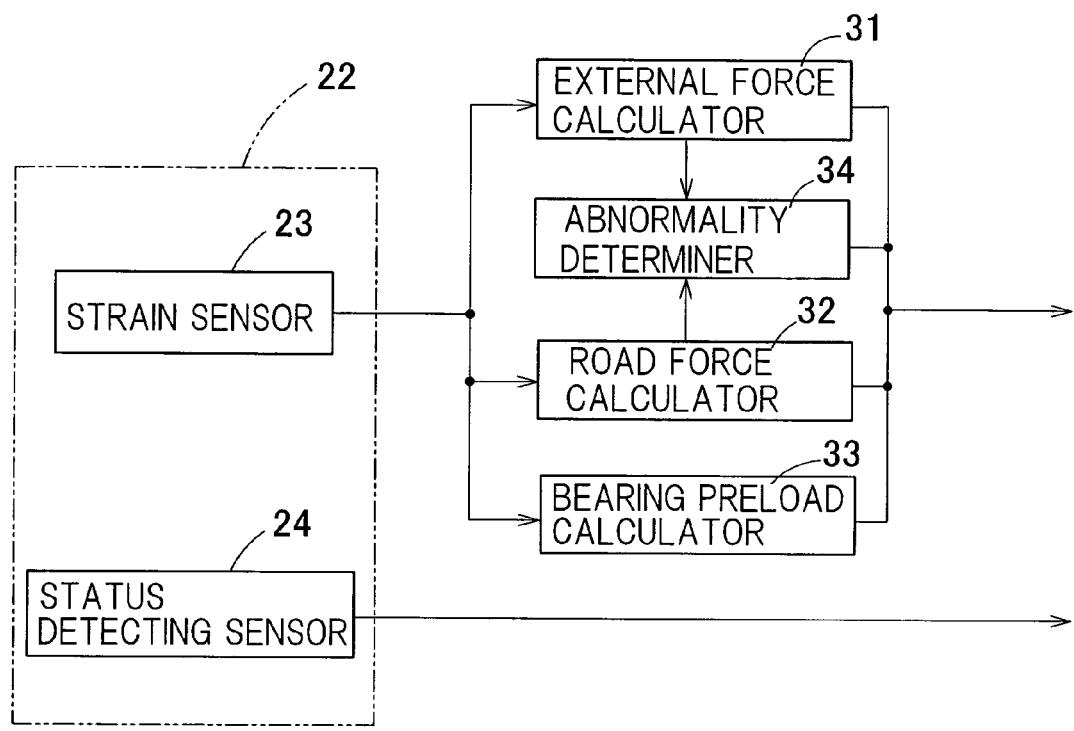
FIG. 31 is a block diagram showing a conceptual structure of a load detecting system for the thirteenth to the eighteenth embodiments of the present invention.

As shown in FIG. 31, the strain sensor 23 is connected to the external force calculator 31, the road force calculator 32, the bearing preload calculator 33, and the abnormality determiner 34. And the outputs of the strain sensors 23 are processed for detecting, for example, a load. Each unit 31 to 34 may be provided in the electronic circuit device (not shown) such as a circuit board fitted to, for example, the outer member 1 of the wheel support bearing assembly or in the electric control unit (ECU) of the automotive vehicle.

The operation of the sensor-incorporated wheel support bearing assembly having the above-mentioned structure will be described focusing only on the steps different from the first or the seventh embodiment. Under the effect of a load acting on the hub axle 9, the outer member 1 is deformed through the rolling elements 5 and the deformation of the outer member 1 is transmitted to the ring member 22 fitted to the inner peripheral surface of the outer member 1, resulting in deformation of the ring member 22. The deformation or a strain on the ring member 22 is measured with the strain sensors 23.

A status of the wheel support bearing assembly is detected by the status detecting sensor 24. The detected status of the wheel support bearing assembly is used for vehicle control of the automotive vehicle, lifespan determination, maintenance determination and the like. For instance, if the acceleration sensor is employed as the status detecting sensor 24, the status, which is an acceleration, may be used for the traveling control of the automotive vehicle. If the vibration sensor is employed as the status detecting sensor 24, the estimation and management of the bearing assembly lifespan are performed from the status which is a vibration of the wheel support bearing assembly. If the moisture sensor is employed as the status detecting sensor 24, the amount of water ingress into the bearing assembly space from the sealing devices 7, 8 is detected, and therefore the status, which is a degradation level of grease due to water ingress, can be obtained.

A fourteenth embodiment of the present invention will now be described with reference to FIGS. 10 and 11 referenced in the second embodiment as well as FIG. 26 referenced in the eighth embodiment. The magnetic encoder 25 is shown in FIG. 11C referenced in the second embodiment, but the magnetic encoder 25 does not appear in FIG. 11C in the fourteenth embodiment and thus reference is made omitting the magnetic encoder 25 in FIG. 11C. This embodiment is similar to the second and the eighth embodiments in the shape of the ring member 22 constituting the sensor unit 21, and also similar to the thirteenth embodiment in the sensor 24 of a different type from the strain sensors affixed to the ring member 22 with the strain sensors 23, and thus same reference numerals are denoted for the common parts and the description thereof will be omitted.

In this embodiment, as described in connection with the second and the eighth embodiments, the strain sensors 23 for measuring the axial strain on the ring member 22 are affixed to the outer peripheral surface of the non-contact ring portion 22b formed at an intermediate portion between the contact ring portion 22a and the thick-walled portion 22c (the bottom portion of recess groove shaped portion between the contact ring portion 22a and the thick-walled portion 22c). The status detecting sensor 24 for detecting a status of the wheel support bearing assembly, of a type different from the strain sensor 23, is affixed to the inner peripheral surface of the ring member 22.

Also, as described above, under the effect of a load acting on the hub axle 9, the outer member 1 is deformed through the rolling elements 5 and the deformation of the outer member 1 is transmitted to the ring member 22 fitted to the inner peripheral surface of the outer member 1, resulting in deformation of the ring member 22. The deformation or a strain on the ring member 22 is measured with the strain sensors 23.

In this embodiment, as described in connection with the thirteenth embodiment, the outputs of the strain sensors 23 may be processed by each unit of the load detecting system shown in FIG. 31.

A fifteenth embodiment of the present invention will now be described with reference to FIGS. 13 and 14 referenced in the third embodiment as well as FIG. 27 referenced in the ninth embodiment. The magnetic encoder 25 is shown in FIG. 14C referenced in the third embodiment, but the magnetic encoder 25 does not appear in FIG. 14C in the fifteenth embodiment and thus reference is made omitting the magnetic encoder 25 in FIG. 14C. This embodiment is similar to the third and the ninth embodiments in the shape of the ring member 22 constituting the sensor unit 21, and also similar to the thirteenth and the fourteenth embodiments in the sensor 24 of a different type from the strain sensor 23 affixed to the ring member 22 with the strain sensors 23, and thus same reference numerals are denoted for the common parts and the description thereof will be omitted.

In this embodiment, as described in connection with the third and the ninth embodiments, the strain sensor 23 for measuring the axial strain on the ring member 22 are affixed to the outer peripheral surface of the non-contact ring portion 22b between the contact ring portion 22a and the flange portion 22d (the outer peripheral surface of a cylindrical portion between the contact ring portion 22a and the flange portion 22d). The status detecting sensor 24 for detecting a status of the wheel support bearing assembly, which is of a type different from the strain sensor 23, is affixed to the inner peripheral surface of the ring member 22.

Also, under the effect of a load acting on the hub axle 9, the outer member 1 is deformed through the rolling elements 5 and the deformation of the outer member 1 is transmitted to the ring member 22 fitted to the inner peripheral surface of the outer member 1, resulting in deformation of the ring member 22.

In this embodiment, as described in connection with the thirteenth and the fourteenth embodiments, the outputs of the strain sensors 23 may be processed by each unit of the load detecting system shown in FIG. 31.

A sixteenth embodiment of the present invention will now be described with reference to FIGS. 16 and 17 referenced in the fourth embodiment as well as FIG. 28 referenced in the tenth embodiment. The magnetic encoder 25 is shown in FIG. 17C referenced in the fourth embodiment, but the magnetic encoder 25 does not appear in FIG. 17C in the sixteenth embodiment and thus reference is made omitting the magnetic encoder 25 in FIG. 17C. This embodiment is similar to the fourth and the tenth embodiments in the shape of the ring member 22 constituting the sensor unit 21, and also similar to the thirteenth to the fifteenth embodiments in the sensor 24 of a different type from strain sensor 23 affixed to the ring member 22 with the strain sensors 23s, and thus same reference numerals are denoted for the common parts and the description thereof will be omitted.

In this embodiment, as described in connection with the fourth and the tenth embodiments, the strain sensors 23 for measuring the axial strain on the ring member 22 are affixed to the outer peripheral surface of the non-contact ring portion 22f, that is, the inner bottom surface of the ring member 22. The status detecting sensor 24 for detecting a status of the wheel support bearing assembly, which is of a type different from the strain sensor 23, is affixed to the inner peripheral surface of the ring member 22.

Also, under the effect of a load acting on the hub axle 9, the outer member 1 is deformed through the rolling elements 5 and the deformation is transmitted to the ring member 22 fitted to the inner peripheral surface of the outer member 1, resulting in deformation of the ring member 22.

In this embodiment, as described in connection with the thirteenth to the fifteenth embodiments, outputs of the strain sensors 23 may be processed by each unit of the load detecting system shown in FIG. 31.

A seventeenth embodiment of the present invention will now be described with reference to FIGS. 19 and 20 referenced in the fifth embodiment, as well as FIG. 29 referenced in the eleventh embodiment. The magnetic encoder 25 is shown in FIG. 20C referenced in the fifth embodiment, but the magnetic encoder 25 does not appear in FIG. 20C in the seventeenth embodiment and thus reference is made omitting the magnetic encoder 25 in FIG. 20C. This embodiment is similar to the fifth and the eleventh embodiments in the shape of the ring member 22 constituting the sensor unit 21, and also similar to the thirteenth to the sixteenth embodiments in the status detecting sensor 24 of a different type from the strain sensor 23 affixed to the ring member 22 with the strain sensors 23, and thus same reference numerals are denoted for the common parts and the description thereof will be omitted.

In this embodiment, as described in connection with the fifth and the eleventh embodiments, the strain sensors 23 for measuring a strain on the ring member 22 in a bending direction are affixed to the inner surface of the contact ring portion 22h having a small wall thickness, that is, the surface opposed the contact ring portion 22g. The status detecting sensor 24 for detecting a status of the wheel support bearing assembly, which is of a type different from the strain sensor 23, is affixed to the inner peripheral surface of the ring member 22.

In this seventeenth embodiment, as described above, under the effect of a load acting on the hub axle 9, the outer member 1 is deformed through the rolling elements 5 and the deformation is transmitted to the ring member 22 fitted to the inner peripheral surface of the outer member 1, resulting in deformation of the ring member 22.

In this embodiment, as described in connection with the thirteenth to sixteenth embodiments, the outputs of the strain sensors 23 may be processed by each unit of the load detecting system shown in FIG. 31.

An eighteenth embodiment of the present invention will now be described with reference to FIGS. 22 and 23 referenced in the sixth embodiment as well as FIG. 30 referenced in the twelfth embodiment. This embodiment is similar to the sixth and the twelfth embodiments in the structure of the sensor unit 21, and also similar to the thirteenth to the seventeenth embodiments in the status detecting sensor 24 of a different type from the strain sensor 23 affixed to the sensor mounting member 22 with the strain sensor 23, and thus same reference numerals are denoted for the common parts and the description thereof will be omitted.

In this embodiment, as described in connection with the sixth and the twelfth embodiments, the sensor mounting member 22 has an intermediate portion formed as a notch portion 28c opened to the outer peripheral side of the arcuate shape. The strain sensor 23 is affixed to the inner peripheral surface of the sensor mounting member 22 positioned on a back side of the notch portion 28c. The status detecting sensor 24, which is of a type different from the strain sensor 23, is affixed to the inner peripheral surface of sensor mounting member 22 at a position shifted in the peripheral direction from the strain sensor 23.

Also, under the effect of a load acting on the hub axle 9, the outer member 1 is deformed through the rolling elements 5 and the deformation of the outer member 1 is transmitted to the sensor mounting member 22 fitted to the inner peripheral surface of the outer member 1, resulting in deformation of the sensor mounting member 22.

In this embodiment, as described in connection with the thirteenth to the seventeenth embodiments, the output of the strain sensor 23 may be processed by each unit of the load detecting system shown in FIG. 31.

In the above described embodiments, the sensor unit 21 which is fitted to the inner peripheral surface of the outer member 1 is described. The present invention is also applicable to a sensor unit which is fitted to the outer peripheral surface of the outer member 1.

Furthermore, although the wheel support bearing assembly in which the outer member is the stationary member is described, the present invention is also applicable to a wheel support bearing assembly in which the inner member serves as the stationary member. In this case, the sensor unit 21 is provided on the peripheral surface or the end face of the inner member.

Also, although each of the foregoing embodiments has been shown and described as applied to the wheel support bearing assembly of the third generation type, the present invention may also be applied to a wheel support bearing assembly of a first or second generation type, in which a bearing portion and a hub axle are formed as respective separate components, and to a wheel support bearing assembly of a fourth generation type, in which a portion of the inner member is constituted by an outer race of the constant velocity joint. Yet, the wheel support bearing assembly may be used for the support of a driven wheel and may be employed in a tapered roller type wheel support bearing assembly of any of generation types.

Based on the sensor-incorporated wheel support bearing assembly of the first to the tenth constructions described above, the embodiments of the present invention may employ the constructions summarized as below.

[Eleventh Construction]

The sensor-incorporated wheel support bearing assembly in the first to the tenth construction, in which the stationary member is the outer member.

In other words, in the first to the tenth constructions, the sensor mounting member is fitted to the outer member in case that the outer member is the stationary member while the inner member is the rotatable member.

[Twelfth Construction]

The sensor-incorporated wheel support bearing assembly in the ninth construction, in which the magnetic sensor includes a sensor using Hall effect.

In other words, the magnetic sensor may be a sensor using Hall effect.

[Thirteenth Construction]

The sensor-incorporated wheel support bearing assembly in the ninth construction, in which the magnetic sensor includes a sensor using magnetoresistive effect.

In other words, the magnetic sensor may be a sensor using magnetoresistive effect.

[Fourteenth Construction]

The sensor-incorporated wheel support bearing assembly in the ninth construction, in which the to-be-detected member is a magnetic encoder and at least one of magnetic pole is arranged in a circumferential direction thereof.

In other words, the to-be-detected member may be a magnetic encoder in which at least one magnetic pole is arranged in the circumferential direction.

[Fifteenth Construction]

The sensor-incorporated wheel support bearing assembly in the ninth construction, in which the to-be-detected member has a shape including at least one period of concave convex surface in a circumferential direction thereof. In other words, the to-be-detected member may have a shape including at least one period of concave convex surface in the circumferential direction.

[Sixteenth Construction]

The sensor-incorporated wheel support bearing assembly in the ninth construction, in which the to-be-detected member has a shape disposed eccentrically relative to the axis of rotation of the rotatable member.

In other words, the to-be-detected member may have a shape decentered with respect to the center axis of rotation of the rotatable member. When the to-be-detected member is decentered relative to the center axis of rotation of the rotatable member, the magnitude of the magnetic flux from the to-be-detected member to the magnetic sensor changes with the rotation angle of the rotatable member, and thus the absolute angle can be detected.

[Seventeenth Construction]

The sensor-incorporated wheel support bearing assembly in the tenth construction, in which the temperature sensor includes a platinum resistance thermometer.

In other words, platinum resistance thermometer may be used for the temperature sensor.

[Eighteenth Construction]

The sensor-incorporated wheel support bearing assembly in the tenth construction, in which the temperature sensor includes a thermocouple.

In other words, thermocouple may be used for the temperature sensor.

[Nineteenth Construction]

The sensor-incorporated wheel support bearing assembly in the tenth construction, in which the temperature sensor includes a thermistor In other words, thermistor may be used for the temperature sensor.

[Twentieth Construction]

The sensor-incorporated wheel support bearing assembly in the tenth construction, further including a temperature compensator for compensating for temperature characteristics of the strain sensor based on the output of the temperature sensor.

In other words, it is preferable to provide a temperature compensator for compensating for temperature characteristics of the strain sensor based on the output of the temperature sensor. The influence of the temperature on the strain sensor is eliminated by providing the temperature compensator, resulting in detection of the load with high accuracy.

What is claimed is:

1. A sensor-incorporated wheel support bearing assembly to rotatably support a wheel relative to an automotive body structure, comprises:
   an outer member having an inner peripheral surface formed with a plurality of raceways;
   an inner member having an outer peripheral surface formed with a plurality of raceways in face-to-face relation with the raceways in the outer member; and
   a plurality of rows of rolling elements interposed between the raceways in the outer member and the raceways in the inner member, respectively, wherein one of the outer member and the inner member, which serves as a stationary member, is fitted with a sensor mounting member on a peripheral surface or an end face thereof, the sensor mounting member being provided with a strain sensor, the sensor mounting member is further provided with a status detecting sensor to detecting different status other than a strain, the sensor mounting member is a ring member, and a plurality of the strain sensors are affixed to the ring member to measure a strain on the ring member, and the ring member includes at an axially intermediate portion thereof a first non-contact ring portion not in contact with the stationary member, at one axial end thereof a contact ring portion in contact with the stationary member, and at the other axial end thereof a second non-contact ring portion having a wall thickness greater than that of the first non-contacting portion, and the strain sensor is fitted to the first non-contacting portion to measure an axial strain on the ring member.

2. The sensor-incorporated wheel support bearing assembly as claimed in claim 1, wherein the sensor mounting member includes at least two contact mounting portions in contact with the stationary member, at least one notch portion positioned between the adjacent contact mounting portions, and wherein the strain is arranged in the notch portion.

3. The sensor-incorporated wheel support bearing assembly as claimed in claim 1, wherein the status detecting sensor is a magnetic sensor to detect a rotation, and a to-be-detected member made up of a magnetic material is fitted to a rotatable member so as to confront the magnetic sensor.

4. The sensor-incorporated wheel support bearing assembly as claimed in claim 1, wherein the status detecting sensor is a temperature sensor.

5. The sensor-incorporated wheel support bearing assembly as claimed in claim 1, wherein the status detecting sensor is at least one of an acceleration sensor, a vibration sensor and a moisture sensor.

6. A sensor-incorporated wheel support bearing assembly to rotatably support a wheel relative to an automotive body structure, comprising:

an outer member having an inner peripheral surface formed with a plurality of raceways;

an inner member having an outer peripheral surface formed with a plurality of raceways in face-to-face relation with the raceways in the outer member; and a plurality of rows of rolling elements interposed between the raceways in the outer member and the raceways in the inner member, respectively, wherein one of the outer member and the inner member, which serves as a stationary member, is fitted with a sensor mounting member on a peripheral surface or an end face thereof, the sensor mounting member being provided with a strain sensor, the sensor mounting member is further provided with a status detecting sensor to detect different status other than a strain, the sensor mounting member is a ring member, and a plurality of the strain sensors are affixed to the ring member to measure a strain on the ring member, and the ring member includes at an axially intermediate portion thereof a first non-contact ring portion not in contact with the stationary member, at one axial end thereof a contact ring portion in contact with the stationary member, and at the other axial end thereof a second non-contact ring portion having a flange portion protruding radially in a direction opposite to the contact ring portion and a wall thickness greater than that of the first non-contacting portion, and the strain sensor is fitted to the first non-contacting portion to measure an axial strain on the ring member.

7. A sensor-incorporated wheel support bearing assembly to rotatably support a wheel relative to an automotive body structure, comprising:

an outer member having an inner peripheral surface formed with a plurality of raceways;

an inner member having an outer peripheral surface formed with a plurality of raceways in face-to-face relation with the raceways in the outer member; and a plurality of rows of rolling elements interposed between the raceways in the outer member and the raceways in the inner member, respectively, wherein one of the outer member and the inner member, which serves as a stationary member, is fitted with a sensor mounting member on a peripheral surface or an end face thereof, the sensor mounting member being provided with a strain sensor, the sensor mounting member is further provided with a status detecting sensor to detect different status other than a strain, the sensor mounting member is a ring member, and a plurality of the strain sensors are affixed to the ring member to measure a strain on the ring member, and the ring member includes at an axially intermediate portion thereof a non-contact ring portion not in contact with the stationary member, at one axial end thereof a first contact ring portion in contact with the stationary member, and at the other axial end thereof a second contact ring portion in contact with the stationary member, and the strain sensor is fitted to the non-contact ring portion having minimal wall thickness to measure an axial strain on the ring member.

8. A sensor-incorporated wheel support bearing assembly to rotatably support a wheel relative to an automotive body structure, comprising:

an outer member having an inner peripheral surface formed with a plurality of raceways;

an inner member having an outer peripheral surface formed with a plurality of raceways in face-to-face relation with the raceways in the outer member; and a plurality of rows of rolling elements interposed between the raceways in the outer member and the raceways in the inner member, respectively, wherein one of the outer member and the inner member, which serves as a stationary member, is fitted with a sensor mounting member on a peripheral surface or an end face thereof, the sensor mounting member being provided with a strain sensor, the sensor mounting member is further provided with a status detecting sensor to detect different status other than a strain, the sensor mounting member is a ring member, and a plurality of the strain sensors are affixed to the ring member to measure a strain on the ring member, and the ring member includes at an axially intermediate portion thereof a non-contact ring portion not in contact with the stationary member, at one axial end thereof a first contact ring portion in contact with the stationary member, and at the other axial end thereof a second contact ring portion in contact with the stationary member; and the strain sensor is fitted to the first contact portion having minimal wall thickness to measure a bending strain on the ring member.

* * * * *

UNITED STATES PATENT AND TRADEMARK OFFICE
CERTIFICATE OF CORRECTION

| | | |
|---|---|---|
| PATENT NO. | : 7,819,026 B2 | Page 1 of 1 |
| APPLICATION NO. | : 11/991480 | |
| DATED | : October 26, 2010 | |
| INVENTOR(S) | : Takayoshi Ozaki et al. | |

It is certified that error appears in the above-identified patent and that said Letters Patent is hereby corrected as shown below:

Column 26, Line 59 in Claim 1, delete "comprises:" and insert --comprising:--, therefor.

Signed and Sealed this
Twelfth Day of April, 2011

David J. Kappos
*Director of the United States Patent and Trademark Office*